(12) United States Patent
Ebstein

(10) Patent No.: US 11,002,688 B2
(45) Date of Patent: *May 11, 2021

(54) SYSTEM FOR ACTINIC INSPECTION OF SEMICONDUCTOR MASKS

(71) Applicant: Steven M. Ebstein, Newton, MA (US)

(72) Inventor: Steven M. Ebstein, Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,241

(22) Filed: Jul. 9, 2019

(65) Prior Publication Data

US 2019/0331611 A1 Oct. 31, 2019

Related U.S. Application Data

(63) Continuation-in-part of application No. 15/423,239, filed on Feb. 2, 2017, now Pat. No. 10,346,964.

(60) Provisional application No. 62/290,139, filed on Feb. 2, 2016.

(51) Int. Cl.
| | |
|---|---|
| *G06T 7/00* | (2017.01) |
| *G01N 21/95* | (2006.01) |
| *H04N 5/225* | (2006.01) |
| *G02B 21/00* | (2006.01) |
| *G02B 5/18* | (2006.01) |
| *H01S 3/09* | (2006.01) |

(52) U.S. Cl.
CPC ......... *G01N 21/95* (2013.01); *G02B 21/0016* (2013.01); *G02B 21/0056* (2013.01); *H04N 5/2256* (2013.01); *G01N 2201/06113* (2013.01); *G02B 5/1876* (2013.01); *H01S 3/0903* (2013.01)

(58) Field of Classification Search
CPC ............... G01N 21/95; G02B 21/0016; G02B 21/0056; H04N 5/2256
See application file for complete search history.

(56) References Cited

U.S. PATENT DOCUMENTS

| | | | | |
|---|---|---|---|---|
| 5,539,514 A | * | 7/1996 | Shishido | G01N 21/94 356/237.4 |
| 9,574,868 B2 | * | 2/2017 | Shaked | G01B 9/02057 |
| 9,632,033 B2 | | 4/2017 | Den Boef et al. | |

(Continued)

OTHER PUBLICATIONS

Ackermann, W. et al., "Operation of a free-electron laser from the extreme ultraviolet to the water window", Nature Photonics 1, 2007, pp. 336-342.

(Continued)

*Primary Examiner* — Jonathan R Messmore
(74) *Attorney, Agent, or Firm* — Pandiscio & Pandiscio

(57) ABSTRACT

An apparatus and method are disclosed for actinic inspection of semiconductor masks intended for extended ultraviolet (EUV) lithography, or similar objects, with feature sizes less than 100 nm. The approach uses a coherent light source with wavelength less than 120 nm. Inside a vacuum system, an optical system directs the light to an object, i.e., the mask or mask blank, and directs the resulting reflected or transmitted light to an imaging sensor. A computational system processes the imaging sensor data to generate phase and amplitude images of the object. The preferred imaging modality, a form of digital holography, produces images of buried structures and phase objects, as well as amplitude or reflectance images, with nanometer resolution less than or equal to the feature size of the mask.

30 Claims, 8 Drawing Sheets
(6 of 8 Drawing Sheet(s) Filed in Color)

Schematic view of the APMI optical system (not to scale)

(56) References Cited

U.S. PATENT DOCUMENTS

| | | | | |
|---|---|---|---|---|
| 9,632,039 | B2* | 4/2017 | Den Boef | G01B 11/00 |
| 2016/0187849 | A1* | 6/2016 | Zhang | G01N 23/20 |
| | | | | 348/41 |
| 2016/0266057 | A1* | 9/2016 | Dudovich | G03H 1/0443 |

OTHER PUBLICATIONS

ACS Motion Control, Jan. 2016, https://www.acsmotioncontrol.com/presentations.

Allaria, E. et al., "Highly coherent and stable pulses from the FERMI seeded free-electron laser in the extreme ultraviolet", Nature Photonics, vol. 6, No. 10, 2012, pp. 699-704.

Bauke, H. et al., "Accelerating the Fourier split operator method via graphics processing units", Computer Physics Communications, vol. 182, No. 12, 2011, pp. 2454-2463.

Benk, Markus P. et al., "Demonstrations of 22-nm half inch resolution on the SHARP EUV microscope", Journal of Vacuum Science and Technology, vol. 6, 2015.

Fleck, Jr. et al., "Time-Dependent Propagation of High Energy Laser Beams through the Atmosphere", Appl. Phys. vol. 10, 1976, pp. 129-160.

Garcia-Sucerquia, Jorge et al., "Digital in-line holographic microscopy", Appl. Opt., vol. 45, 2006, pp. 836-850.

Garretto et al., "Aerial imaging technology for photomask qualification: from a microscope to a metrology tool" Advanced Optial Technologies, vol. 2 No. 4, 2012, pp. 289-298.

Goldberg et al., "Commissioning an EUV mask microscope for lithography generations reaching 8 nm", Proc. SPIE 8679, 2013.

Goldberg, K.A. et al., "Wavelength-Specific Reflections: A Decade of EUV Actinic Mask Inspection Research", J. Vac. Sci. Technol., vol. 6, 2010.

Guizar-Sicarios, Manuel et al., "Direct image reconstruction from a Fourier intensity pattern using HERALDO", Opt. Lett, vol. 33, 2008, pp. 2668-2670.

KMLabs, "XUUS—high harmonic generation source for EUV and soft X-ray", https://www.kmlabs.com/product/xuus/.

Krenkel, M. et al., "Transport of intensity phase reconstruction to solve the twin image problem in holographic x-ray imaging", Opt. Express, vol. 21, 2013, pp. 2220-2235.

Latychevskaia, Tatiana et al., "Solution to the Twin Image Problem in Holography", Phys. Rev. Lett., vol. 98, 2007.

Leith, Emmett N. et al., "Wavefront Reconstruction with Continuous-Tone Objects", J. Opt. Soc. Am., vol. 53, 1963, pp. 1377-1381.

Makowski, M. et al., "Three-plane phase-only computer hologram generated with iterative Fresnel algoritm", Opt. Eng., vol. 44, No. 12, 2005.

Mizobuchi, K. et al., "4.5 µm Pixel Pitch 154 ke—Full Well Capacity CMOS Image Sensor," Proceedings of the International Image Sensor Workshop, Bergen, Norway, Jun. 2009, pp. 235-238.

Paul, Ariel J., "Coherent EUV Light from High-Order Harmonic Generation: Enhancement and Applications to Lensless Diffractive Imaging", Ph.D. dissertation, University of Colorado, 2007.

Seaberg, M. et al., "Ultrahigh 22 nm resolution coherent diffractive imaging using a desktop 13 nm harmonic source", Opt. Exp., vol. 19, 2011.

Talanov, V.I., "Focusing of light in cubic media", Sov. Phys. JETP Lett., vol. 11, 1970, pp. 199-201.

Walk, D. et al., "Solutions for EUV Mask and Blank Inspections" KLA Tencor, 2012.

Wang et al., "Recording conditions of digital holography", Proc. SPIE 6279, 27th International Congress on High-Speed Photograph and Photonics, 62791J (Jan. 11, 2007), doi: 10.1117/12.725187.

Weiss, Markus R. et al., "Actinic review of EUV masks: First results from the AIMS™ EUV system integration", Proc. SPIE, vol. 9048, No. 32, pp. 1-9.

\* cited by examiner

Required number of exposures vs. resolution for 2Kx2K images

Schematic view of an alternate APMI optical system (not to scale)

Example FZPs and their corresponding focal spots when illuminated with a uniform plane wave. From left to right are on-axis, off-axis, and dual off-axis FZPs. From top to bottom are the FZP (transmissive or opaque), the spot images at 0.97X the focal distance, and at the focal distance.

Portion of an EUV Fresnel zone plate with 'stenciled' zones.

Timing diagram for the motion sequence, exposure, and readout of an image.

Fringe patterns (left) and Fourier transforms (right) of the sum of two offset spherical waves (a); the same spherical waves with some $(x^4 + y^4)$ contribution (b); and the difference of the fringe patterns (c).

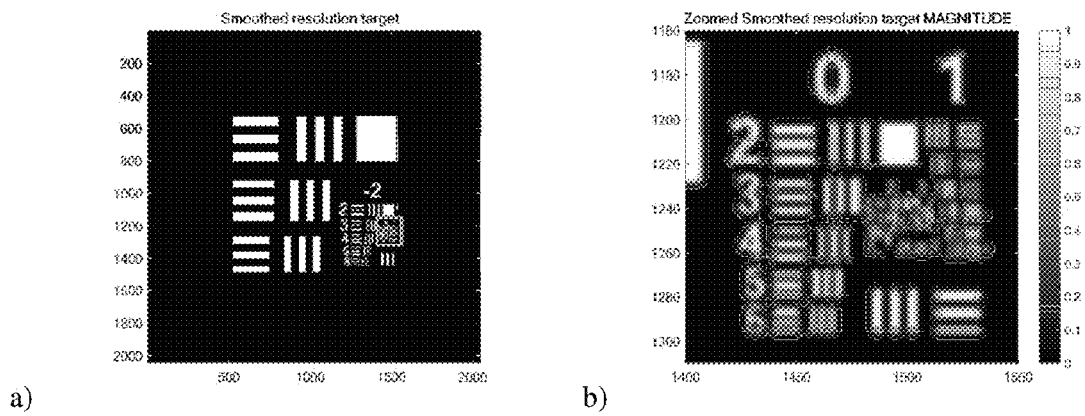

USAF resolution target used for the simulation: a) is the spatially filtered image and b) is the zoomed image of the green rectangle.

FIG. 7

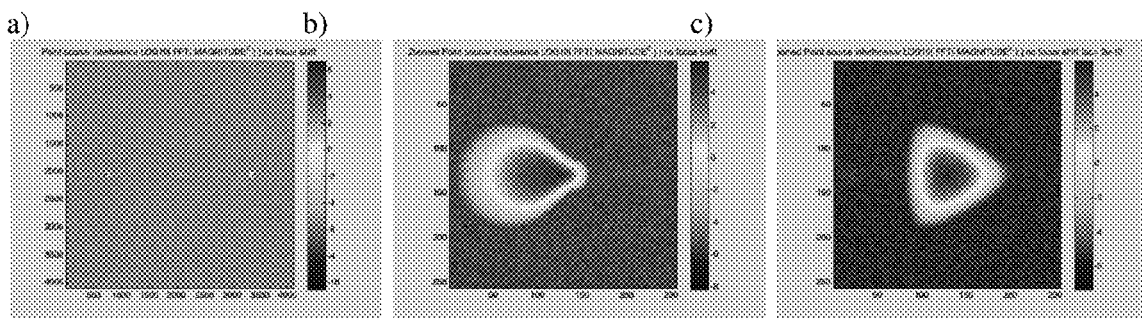

Log10 of the Fourier transform of the intensity image of two interfering spherical waves (a). The off-axis lobes are larger than the zero frequency lobe due to nonlinear fringes. With higher resolution, the left lobe of a pure spherical wave is shown in (b) and of a spherical wave with a ($x^4 + y^4$) term that straightens the fringes in (c).

FIG. 8

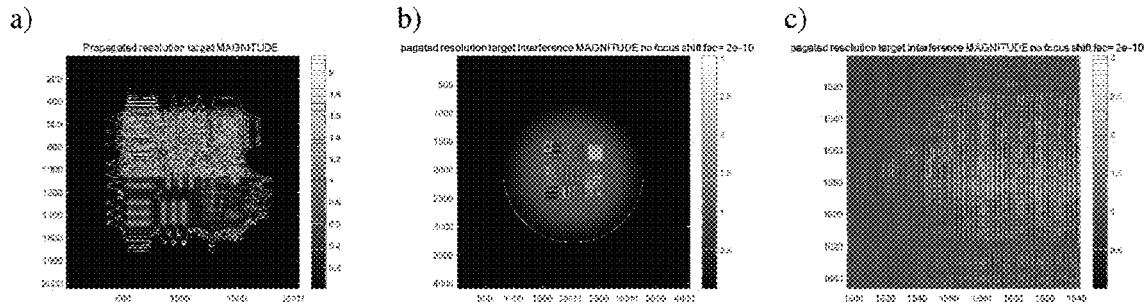

The propagated mask pattern and its interference with a reference beam. The PCMP alone is shown in (a). The interference pattern $|\mathcal{P}U_0 + U_1|^2$ is shown in (b) and a zoomed image of the green rectangle in (c).

FIG. 9

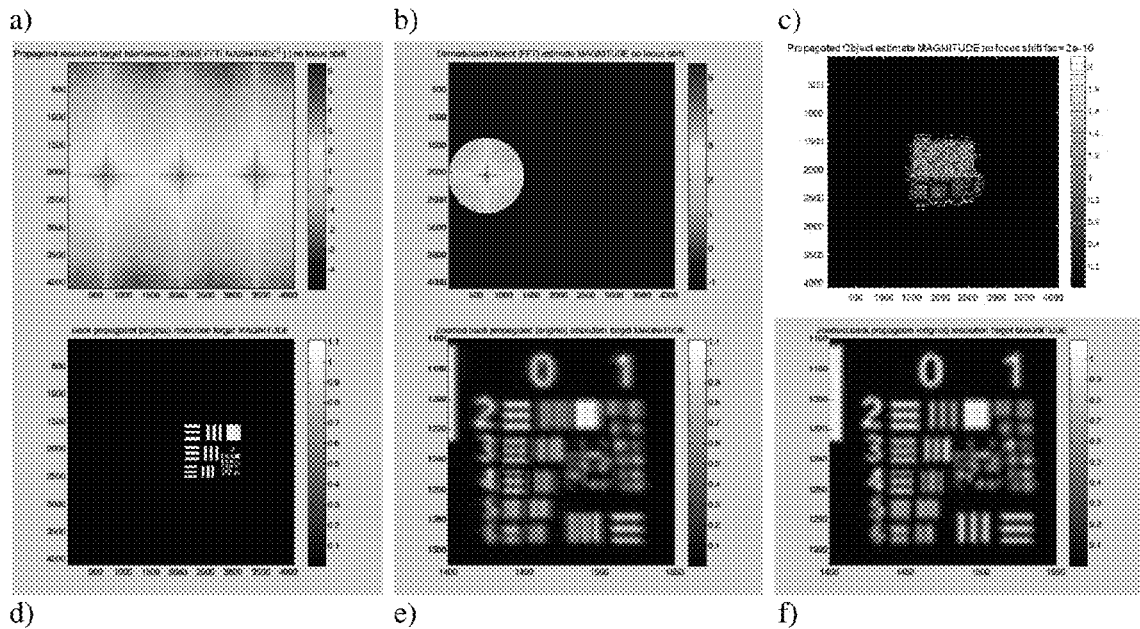

The output of the FM algorithm and back-propagation are shown. The $\log_{10}$ magnitude of the FFT of the detector image is shown in (a) and after masking in (b). The inverse FFT shows the PCMP in (c) which is then back propagated to estimate the CMR in (d). The zoomed image corresponding to Fig. 7b is shown in (e) and (f). (e) uses pure spherical waves as in Fig. 8b. (f) has better x-resolution since it uses a spherical wave with a $(x^4+y^4)$ term that straightens the fringes as in Fig. 8c.

FIG. 10

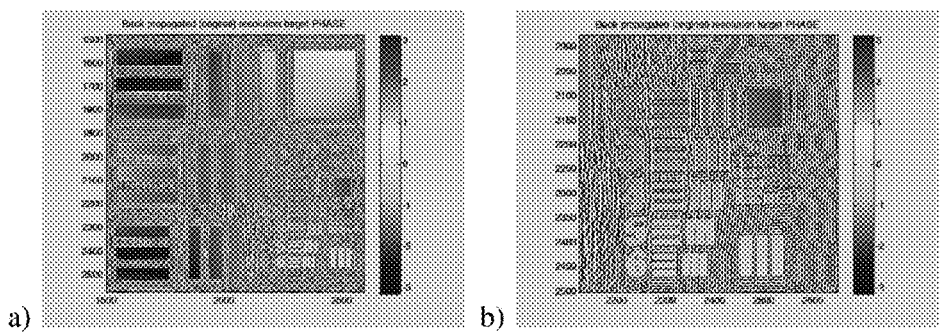

The phase of the back-propagated image in Fig. 10f is displayed. The entire recovered image is shown in (a) with a zoomed version in (b)

FIG. 11

SYSTEM FOR ACTINIC INSPECTION OF SEMICONDUCTOR MASKS

REFERENCE TO PENDING PRIOR PATENT APPLICATIONS

This patent application:

(1) is a continuation-in-part of pending prior U.S. Non-Provisional patent application Ser. No. 15/423,239, filed Feb. 2, 2017 by Steven M. Ebstein for SYSTEM FOR ACTINIC INSPECTION OF SEMICONDUCTOR MASKS, which patent application:

(A) claims benefit of prior U.S. Provisional Patent Application Ser. No. 62/290,139, filed Feb. 2, 2016 by Steven M. Ebstein for SYSTEM FOR ACTINIC INSPECTION OF SEMICONDUCTOR MASKS.

The two (2) above-identified patent applications are hereby incorporated herein by reference.

FEDERALLY SPONSORED RESEARCH

None

Petition for Acceptance of Color Photographs and/or Color Drawings

Applicant respectfully petitions that color photographs and/or color drawings be accepted in this patent application.

Applicant is filing, concurrently with this patent application, an appropriate PETITION UNDER 37 CFR 1.84(a)(2), and paying the required fee as set forth in 37 CFR 1.17(h).

Applicant has also included an appropriate statement in the brief description of the drawings section of the specification.

FIELD OF THE INVENTION

The present invention pertains to a system for actinic inspection of semiconductor masks that images buried structures and phase objects as well as amplitude (or reflectance). The present invention relates to digital holographic microscopy with nanometer resolution.

BACKGROUND OF THE INVENTION

Semiconductor manufacturers strive to reduce the size of devices in order to reduce power consumption and increase gate density and thereby deliver faster circuits with greater processing power at lower cost to their customers. This has led to development of generations of photolithographic equipment for patterning the semiconductor wafers where the minimum feature size, e.g., the width of the smallest patterned line, has shrunk with each successive generation.

The vast majority of current practice uses deep UV (DUV) light at 193 nm wavelength when patterning the semiconductor wafer and produces features that are much smaller than the illumination wavelength in vacuum. In order to produce features significantly smaller than the wavelength, immersion lithography is used to reduce the wavelength at the wafer by forming the image in a liquid with refractive index >1, as well as using multiple patterning to produce features smaller than the spot width. However, the cost to produce small features of interest, <20 nm, has begun to rapidly rise when using DUV systems due to the large number of steps and masks required for multiple patterning.

In order to produce small features economically, the industry has begun using extreme ultraviolet (EUV) lithography. While EUV typically refers to wavelengths between 120 nm and 10 nm, current EUV lithography tools use 13.5 nm light emitted by laser-produced plasma sources with $CO_2$ lasers exciting tin droplets. Future generations may require soft x-ray (SXR) lithography with wavelengths <10 nm. Using a significantly shorter wavelength can greatly simplify the process and hence the cost to produce features <20 nm.

In order to efficiently and economically produce good parts, masks used in semiconductor photolithography must be nearly free of defects. For this reason, comprehensive mask inspection, i.e. inspection of the entire mask pattern, is part of the infrastructure and normal workflow in semiconductor fabrication. Masks are typically inspected at multiple points in the masks life cycle. The blanks must be inspected before and after the mask pattern is produced, when a potential defect has been identified in a mask in use for lithography, and/or after a defect has been repaired.

The masks used for semiconductor photolithography are oversized, with the mask image demagnified at the surface of the wafer, typically by 4×. Thus, a 22 nm feature is 88 nm at the mask and a 14 nm feature is 56 nm at the mask. These features are smaller than the Abbe resolution limit, related to the inspection wavelength, of DUV lithography tools that use 193 nm light.

The size of EUV masks and the requirement to image small features results in a very large number of resolution elements, i.e. pixels, which must be imaged during a comprehensive inspection of the entire pattern. This presents one of the great challenges for comprehensive EUV mask inspection. EUV masks at 4× scale are patterned over a 132 mm×104 mm area that is reduced to 33 mm×26 mm at the wafer. It is instructive to consider how many discrete images are required to image the entire mask. Assume that each image produces a 2K×2K (non-overlapping) image that tiles the entire patterned area of the mask. Then the number of exposures required to cover the entire mask is a function of the resolution of each sub-image. FIG. 1 graphs the number of discrete images required versus resolution, assumed equal to the pixel dimensions. Note that the resolution shown is at the mask, i.e., 4× the resolution at the wafer, so a 40 nm resolution corresponds to 10 nm at the wafer.

This represents a large number of exposures. Let us consider nominal specifications for an imaging system with a required resolution of 13.5 nm at the wafer, or 54 nm at the mask. About 1.12M 2K×2K images are required to tile the entire mask surface. For a 12 hour inspection, this requires 26 images per second. For higher resolution, assuming that the size of each image in pixels remains 2K×2K but now encompasses a smaller area, the required number of exposures increases, thereby increasing the required rate at which images are acquired. For inspection times shorter than 12 hours, the rate increases as well.

Other measures of the imaging task include the average rate at which an image pixel is produced and the rate and quantity of data acquired. For the nominal resolution, image size, and inspection time scenario (i.e., 54 nm/13.5 nm, 2K×2K, and 12 hrs), the inspection system must generate output image pixels at $109 \times 10^6$ pixels/s. Assuming 16-bit precision of the output, the system generates 208 MB/s, or a total of 8.57 TB over the 12 hour inspection period.

For some imaging modalities, the raw images must be larger than the size of the final image. For a scenario discussed below, a 4K×4K image is recorded to yield a 2K×2K image. This multiplies the pixel readout rate and the volume of raw data by a factor of 4. The specifications of this nominal imaging scenario will be useful when considering potential approaches for comprehensive EUV mask inspection.

Due to the higher resolution required for EUV lithography, a variety of approaches have been considered for inspecting EUV masks and mask blanks. Typically, these approaches must image the mask with a resolution comparable to, or smaller than, the optical resolution of the exposure tool in order to reliably spot significant defects in the mask. The challenge is to do so with an affordable instrument which can reliably identify and analyze defects significant enough to affect the lithography process, and which fits into the infrastructure of semiconductor manufacturing.

Of greatest interest are approaches which use the actinic EUV wavelength for inspection. The goal of inspection is to predict the mask performance when used for lithography. Only actinic inspection probes the mask using the same physical mechanism, i.e., illumination with 13.5 nm light, as when the mask is used for lithography. Thus actinic inspection has the potential for predicting mask performance with the greatest accuracy.

Actinic patterned mask inspection (APMI) is especially important since some mask defects are primarily phase defects, i.e., they change the phase of the light projected onto the wafer. For EUV lithography, the mask, like all of the optics, is reflective, since transmission losses are too large for practical materials. At EUV wavelengths, reflective coatings are Bragg reflectors, a stack of thin film coatings designed for high reflectivity, produced in a manner similar to multilayer dielectric coatings for visible and near-visible wavelengths. The coatings are typically multilayer stacks of silicon and molybdenum with tens of layers. The mask pattern is formed by patterning an absorber layered on top of the reflective stack.

If there is a defect or particle on the mask substrate, it is possible that the multilayer coating will be reflective, but will have a phase shift due to the local surface being higher or lower than the surrounding surface. A similar effect can occur with a particle or defect that is embedded in the multilayer coating. Due to the stringent resolution requirements and partial coherence of the EUV illumination used during lithography, these phase shift errors can significantly affect the geometry or the sharpness of the geometry patterned by the lithography. Many of these phase shift errors may not be detectable by any means except by using actinic radiation for inspection.

It was assumed that a tool for APMI would be required for EUV lithography. Early approaches to this problem were similar to those used with 193 nm DUV inspection tools in that they used incoherent imaging. However, EUV light sources and optics are very different than their DUV counterparts which made this a difficult technical undertaking, e.g., transmissive optics are not available for the EUV, the mask is reflective rather than transmissive, and the EUV inspection must be done in vacuum.

For EUV wavelengths, an incoherent optical imaging system consists of reflective optics whose surface figures (a term of art referring to the accuracy with which an optical surface conforms to its intended shape) are accurate enough for 13.5 nm light, which is over an order of magnitude more accurate than optics for 193 nm DUV tools. An optical system for EUV inspection analogous to a DUV system is thus expensive due to its complexity and exacting specifications.

Another drawback is that incoherent imaging is not typically sensitive to phase defects. Moreover, the very short EUV wavelengths require that the focal distance, i.e., the distance from the mask surface to the optics, be controlled with extremely tight tolerances, which can be very challenging when scanning across a mask that is ~10 cm across.

KLA-Tencor described such a concept for an EUV mask inspection platform sometimes referred to as "the 710 System" (see "Solutions for EUV Mask and Blank Inspections 2012 D. Wackand G. Inderhees.pdf"). This proposed system (designated "the 7xx tool") has a module located inside the cleanroom with dimensions 9 m×3 m×3.1 m (length×width×height) and 2 modules in the room below, outside the cleanroom, each with comparable footprints and volumes as the module inside the cleanroom. The proposed system is small enough to be installed as one of the suite of instruments present in the cleanroom of a semiconductor fabrication facility and hence be used in the normal workflow. However, this approach was abandoned, presumably either due to technical difficulties or cost.

An instrument sharing some similarities with the aforementioned KLA-Tencor 710 System is the AIMS™ EUV system developed by Zeiss and the SEMATECH EUVL Mask Infrastructure consortium (see Markus R. Weiss et al., "Actinic review of EUV masks: First results from the AIMS™ EUV system integration, Proc. SPIE v. 9048 no. 32, 2014). This system uses conventional incoherent imaging with optics consisting of reflective EUV mirrors. It records individual images microns in size, but at a rate too slow to image the entire mask in a reasonable time, partly because it is refocused or scanned in focus at each imaged location. Thus it is suited for defect review, but not comprehensive imaging of the entire mask, as is done in the normal workflow for lithography done using DUV.

A very different approach would be to use coherent imaging since there are coherent imaging approaches which do not require expensive reflective optics or maintaining the (focus) distance with nanometer precision. Coherent imaging approaches are distinguished by the source employed as well as the optics and imaging method.

One coherent imaging approach for actinic inspection uses synchrotron radiation as the illuminating light source and Fresnel zone plate (FZP) optics. Using relatively bright synchrotron light (see K. A. Goldberg, I. Mochi, "Wavelength-Specific Reflections: A Decade of EUV Actinic Mask Inspection Research," *J. Vac. Sci. Technol. B* 28 (6), C6E1-10 (2010). DOI 10.1116/1.3498757), which has an arbitrarily selectable wavelength, EUV microscopes can image significant areas of EUV masks, with resolution down to 22 nm, with current technology (see Markus P. Benk, Kenneth A. Goldberg, Antoine Wojdyla, Christopher N. Anderson, Farhad Salmassi, Patrick P. Naulleau, and Michael Kocsis, "Demonstration of 22-nm half pitch resolution on the SHARP EUV microscope," *Journal of Vacuum Science and Technology* B33 (6), 06FE01 (2015). DOI 10.1116/1.4929509).

However, synchrotrons are large accelerators that are expensive and require large, dedicated facilities, which imposes significant practical limitations, i.e., cost and availability, on their utility for mask inspection. In addition, these synchrotron inspection systems have not yet achieved finer resolution for routine imaging, so there is room for improvement using different imaging techniques. It is far more desirable to perform EUV mask inspection with a smaller instrument that can be installed in a semiconductor or mask fabrication facility. Such an instrument would have lower cost and much higher usability than large, dedicated synchrotron facilities and would integrate into the workflow of the fabrication facility.

Another coherent imaging approach which could be realized with a compact system is coherent diffractive imaging (CDI). In this approach, the object is illuminated with a coherent beam. An imaging sensor records an image of the intensity of the diffraction pattern (see M. Seaberg, et al., "Ultrahigh 22 nm resolution coherent diffractive imaging using a desktop 13 nm harmonic source," Opt. Exp. 19, 22470 (2011)). Since much of the light is transmitted or reflected in the 0th order, it must be blocked with a beam stop along the optical axis so as not to wash out the off-axis diffraction pattern. This method uses iterative phase retrieval algorithms, typically with some finite support constraints, to estimate the phase and amplitude object from the diffraction intensity.

While CDI does yield relatively high resolution images, it is an inefficient use of the beam energy, since much of the beam is lost in the 0th order. It also requires many iterations, and hence lengthy computations, to produce the output. The number of iterations required to obtain a high quality reconstruction is not predictable and may take tens or hundreds of iterations. This computation, along with the inefficient use of the illuminating beam, represents serious limitations to using CDI for inspection tasks, especially comprehensive APMI. Even if it were possible to collect the data in a reasonable time period, it could take much longer to process the data to yield the image of the entire mask. It would be much more advantageous to use an approach that produces deterministic imagery which can be produced in real time.

Thus there exists an unmet need for an actinic mask inspection system for EUV lithography that serves a similar role to mask inspection systems for DUV lithography. The system should efficiently use the source illumination. The system should be able to image phase defects as well as amplitude defects, and scan masks with adequate throughput to inspect the entire mask in a reasonable period of time. The system should be significantly less complicated than an approach which both requires mirrors whose surface figures must be accurate to several nanometers and alignment to similar tolerances while scanning the entire surface of the mask. The system should also produce mask images with a deterministic algorithm that does not require iteration.

In the following specification, conventional optical imaging nomenclature will be used to refer to the target of the system as the object. The discussion will center on application to the inspection and imaging of reflective EUV semiconductor lithography masks. However, it will be appreciated that with modifications obvious to those skilled in the art in view of the present disclosure, the present invention has general application to imaging other objects with comparable resolution, including objects imaged in transmission.

SUMMARY OF THE INVENTION

In accordance with preferred embodiments of the present invention, an apparatus and method are provided for performing actinic inspection of semiconductor masks with feature sizes of less than 100 nm. The apparatus provides a coherent source of light with a wavelength of less than 120 nm. Inside a vacuum system, an optical system divides the source light into a first beam and a second, different beam, and directs the first beam to illuminate the object, i.e., the mask or mask blank, and directs the second beam to interfere with the first beam at an imaging sensor such as a charge-coupled device (CCD) or complementary metal-oxide-semiconductor (CMOS) array. In one form of the invention, the angle between the two beams is less than 6.75 mrad. The imaging sensor (or detector) records the intensity of the interference pattern or diffraction image (DI). A computational system processes the DI to generate phase and amplitude images of the object.

In a preferred form of the present invention, the source comprises a gas cell which generates the coherent light characterized generally by a propagation direction using high harmonic generation (HHG) from an intense pulse of an ultrafast laser.

In a preferred form of the present invention, the source comprises a compact free electron laser (FEL) which generates the coherent light characterized generally by a propagation direction by passing an electron beam through a magnetic structure known as an undulator (which consists of a periodic arrangement of magnets with alternating poles projecting a magnetic field across the beam path).

In a preferred form of the present invention, the optical system comprises a diffractive optic.

In a preferred form of the present invention, the optical system comprises a compound zone plate optic comprising a transmissive diffractive optic.

In a preferred form of the present invention, the optical system comprises a series of mirrors to direct the second beam.

In a preferred form of the present invention, the imaging sensor is an arrayed sensor with pixels 6 microns square or smaller.

In a preferred form of the present invention, the beams have optical aberrations which produce straighter interference fringes than purely spherical waves.

In a preferred form of the invention, there is provided an apparatus for imaging an object with resolution less than 100 nm, the apparatus comprising:

a coherent light source with wavelength less than 120 nm;

an optical system for directing the source light to an object and directing light from the object to an imaging sensor, wherein the optical system divides the source light into a first beam and a second, different beam and directs the first beam to illuminate the object and directs the second beam to interfere with the first beam, and wherein the angle between the two beams is less than 6.75 mrad; and a computational system that processes the imaging sensor data to generate phase and amplitude images of the object.

In another preferred form of the invention, there is provided an apparatus for imaging an object, the apparatus comprising:

a coherent light source;

an optical system for directing the source light to an object and directing light from the object to an imaging sensor, wherein the optical system divides the source light into a first beam and a second, different beam and directs the first beam to illuminate the object and directs the second beam to interfere with the first beam, and wherein the two beams have optical aberrations which produce straighter interference fringes than purely spherical waves; and a computational system that processes the imaging sensor data to generate phase and amplitude images of the object.

In another preferred form of the invention, there is provided a method for imaging an object with resolution less than 100 nm, the method comprising:

providing coherent light with wavelength less than 120 nm;

directing the light to an object and directing light from the object to an imaging sensor, wherein an optical system divides the source light into a first beam and a second, different beam and directs the first beam to illuminate the object and directs the second beam to interfere with the first beam, and wherein the angle between the two beams is less than 6.75 mrad; and processing the imaging sensor data to generate phase and amplitude images of the object.

In another preferred form of the invention, there is provided a method for imaging an object, the method comprising:

providing coherent light;

directing the light to an object and directing light from the object to an imaging sensor, wherein an optical system divides the source light into a first beam and a second, different beam and directs the first beam to illuminate the object and directs the second beam to interfere with the first beam, and wherein the two beams have optical aberrations which produce straighter interference fringes than purely spherical waves; and processing the imaging sensor data to generate phase and amplitude images of the object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of the invention will be more readily understood by reference to the following detailed description, taken with reference to the accompanying drawings, wherein:

FIG. 7 shows the USAF resolution target used as the mask pattern in the imaging simulation;

FIG. 8 shows logarithmic plots of the Fourier transform of the intensity of two interfering point sources with and without compensating aberrations;

FIG. 9 shows simulation images of the propagated mask pattern and its interference with a reference beam;

FIG. 10 shows various simulation outputs of the Fourier Masking (FM) algorithm and back propagation estimates of the mask pattern with and without compensating aberrations; and FIG. 11 shows the phase of the back-propagated estimate of the mask pattern.

DETAILED DESCRIPTION OF THE PREFERRED EMBODIMENTS

Figure 1:
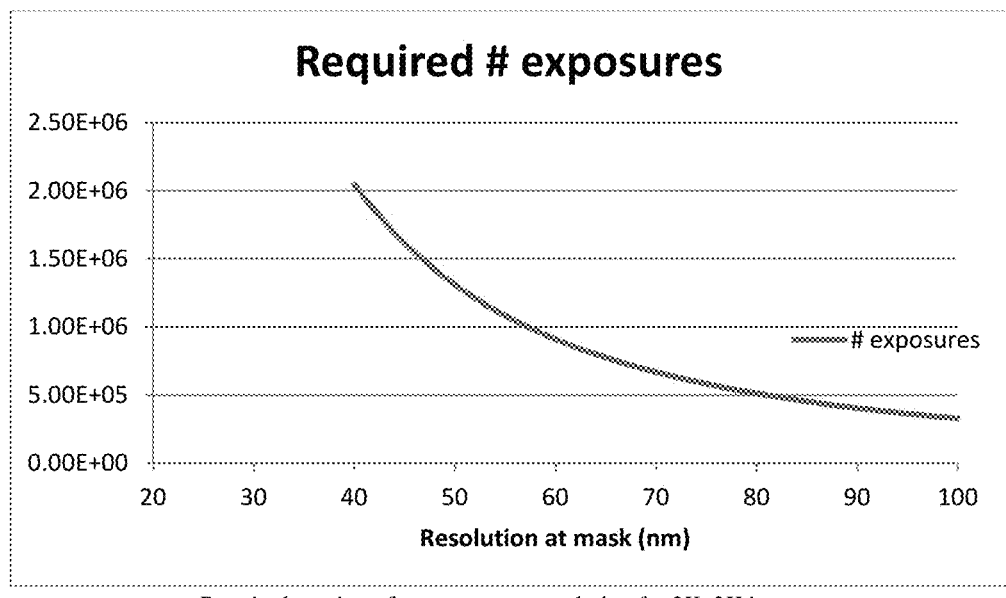
FIG. 1 is a graph of the number of exposures required to image an entire standard EUV mask vs the resolution for 2K×2K images per exposure.
Figure 2:
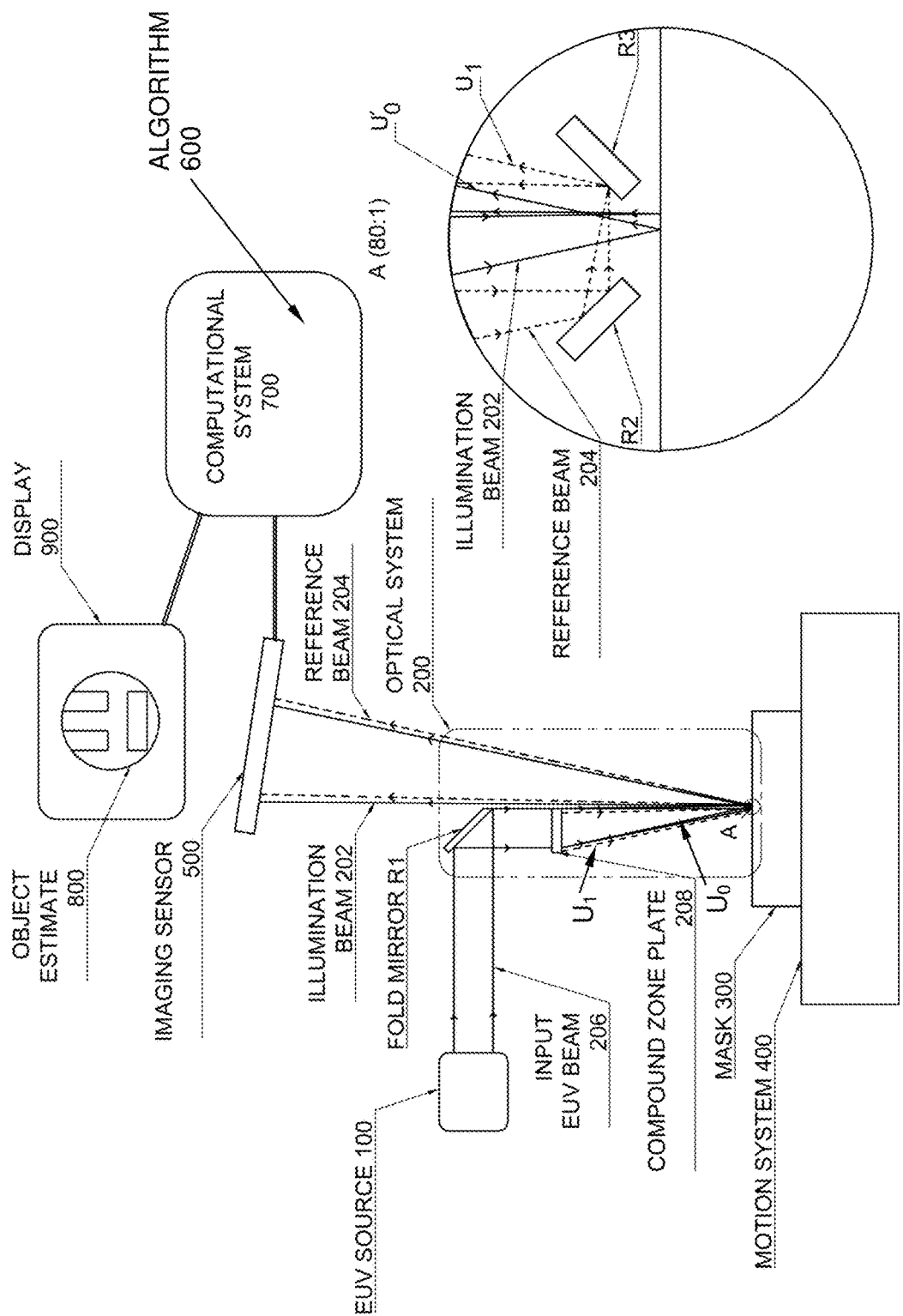
FIG. 2 is a schematic view of a novel optical system formed in accordance with the present invention.

In accordance with preferred embodiments of the present invention, and looking now at FIG. 2, there is provided a novel system comprising a source of coherent electromagnetic radiation 100, typically EUV or soft x-ray, an optical system 200, an object (mask) 300 to be imaged, a motion system 400 for translating the object (mask) 300 relative to the optical system, an imaging sensor 500, an algorithm 600 implemented by a computational system 700, all of which are used to produce an estimate 800 of object (mask) 300 and present the estimate on a display 900 with resolution less than 100 nm.

In order to easily measure the complex reflectivity (amplitude and phase) of the mask, the imaging modality is a coherent imaging system. In order to obtain the mask image deterministically, an imaging method similar to imaging interferometry or digital holography is employed. These methods rely on measuring the interference of a coherent beam reflected or scattered by the object with a coherent reference beam.

Source of Coherent Electromagnetic Radiation 100

In order to easily image features that are phase defects, light source 100 must be coherent. Previously, that required using synchrotron radiation, which is produced by an accelerating beam of charged particles. More recently, researchers have found that it is possible to generate coherent beams of extreme ultraviolet (EUV, 120 nm–10 nm) and soft x-ray (SXR, 10 nm–0.1 nm) radiation using a process termed high harmonic generation (HHG). In this process, a pulse from an ultrafast laser, typically with a pulse length measured in femtoseconds (fs), is incident on a gas. The intense laser pulse ("the pump laser") partially ionizes the gas and excites a high harmonic of the laser frequency ("the signal beam") when the ionized electrons are accelerated and slam into the nucleus (see Aria J. Paul, Ph.D. Dissertation: "Coherent EUV Light from High-Order Harmonic Generation: Enhancement and Applications to Lensless Diffractive Imaging", University of Colorado, 2007).

While this is a useful technique, the power of the resulting coherent EUV beam is small. A variety of factors—the pump wavelength, the laser pulse energy and pulse length, the noble gas chosen, the gas pressure, and the waveguide geometry—affect the efficiency of the HHG process. With optimal choices, EUV and SXR conversion efficiencies of $10^{-6}$ to $10^{-3}$ have been achieved with ultrafast lasers having average powers from 1 W-10 W. The resulting short wavelength beam is nearly collimated and has good beam quality and spatial coherence. These microwatt to milliwatt beams are bright enough for many imaging applications. However, the power which has been achieved at the EUV 13.5 nm wavelength is at the low end of this range (see KMLabs XUUS product, https://www.kmlabs.com/product/xuus/). As discussed below in this specification, that power (i.e., the power achieved at the EUV 13.5 nm wavelength) may be insufficient to scan the entire mask in a reasonable period while achieving sufficient signal-to-noise ratio (SNR). This could limit the application of systems using HHG coherent sources to tasks requiring less throughput, e.g., defect review. However, alternate sources of coherent EUV beams are available.

It is possible to generate a coherent EUV beam using a compact FEL. EUV beams with 20 mW of power have been demonstrated by Ackermann et al., at a large facility (see Operation of a free-electron laser from the extreme ultraviolet to the water window, W. Ackermann et al., Nature Photonics 1, 336-342 (2007), Published online: 1 Jun. 2007 I doi:10.1038/nphoton.2007.76). A variety of approaches are being tested for developing compact FELs that should yield comparable power outputs. With no driving input, an FEL will lase when spontaneous excitation begins stimulated emission in a process termed self-amplified spontaneous emission (SASE). Beams with greater temporal coherence and higher output efficiency can be generated when an input beam seeds the stimulated emission. Regarding coherence, Allaria et al. demonstrated a seeded EUV FEL beam with fractional bandwidth of 0.16% (ΔE/E) (see Allaria, E et al. Highly coherent and stable pulses from the FERMI seeded free-electron laser in the extreme ultraviolet, Nature Photonics 6(10). p. 699-704, 2012). It will be seen below that coherent power in the milliwatt range is sufficient for the imaging system of the present invention. Thus a sufficiently high powered and highly coherent EUV beam can be engineered using a compact FEL.

Thus, in accordance with the present invention, light source 100 is configured to provide a coherent EUV beam, and in one preferred form of the present invention, light source 100 comprises a compact FEL.

Optical System 200

For imaging amplitude and phase objects, a coherent imaging approach with interfering beams, such as imaging interferometry or off-axis holography, is preferred. The optics used, and the various parameters of this approach, must be carefully engineered to optimize the information collection.

There are no transmissive optical materials at the EUV actinic wavelength, 13.5 nm, and even air at atmospheric pressure has an absorption length measured in mm. Therefore, reflective optics and a reflective mask are used exclusively for projecting the mask onto the wafer and the mask and optics must be in vacuum. This applies equally to an exposure tool and to any actinic inspection tools. By design, the optical axis is 6° from normal for first generation EUV lithography tools so that the beam reflected off the mask does not intersect the illuminator optics. This is the limiting angle for the edge ray of the illuminating beam in the plane of incidence. For a rotationally symmetric beam, the 6° angle is roughly equivalent to a numerical aperture (NA) 0.10 beam incident on the mask.

First generation EUV lithography tools image the mask onto the wafer with 4× reduction, and newer tools are under development with anamorphic optics that have 4× reduction in one direction and 8× reduction in the orthogonal direction. The demagnification of the mask yields a beam with larger NA at the wafer. The first generation tools (e.g., the NXE 3100 by ASML of Veldhoven, The Netherlands) have a 0.25 NA beam at the wafer and the current generation tools (e.g., the NXE 3400B by ASML) use a 0.33 NA beam. Future generations with 0.55 NA and anamorphic beams are in development. Proposed systems with anamorphic beams take advantage of the fact that the beam angle in the direction orthogonal to the plane of incidence may be larger, thereby increasing the resolution in that direction.

Assuming the optics are diffraction limited, the finest possible resolution of the system is given by $$\delta_R = \frac{k_R \lambda}{NA} \quad (1)$$

where $k_R$ is a proportionality constant that depends on details of the imaging system and the definition of resolution, and $\lambda$ is the wavelength.

In the mask plane, the tolerance for the mask position along the optical axis (similar to the depth of focus, DOF) is given by $$\delta_{DOF} = \frac{k_{DOF} \lambda}{NA^2} \quad (2)$$

for a displacement that leaves the resolution essentially unchanged, again assuming diffraction limited optics, where $k_{DOF}$ is a proportionality constant that depends on details of the imaging system and the definition of depth of focus.

An optimally designed system starts with the relationship between the number of pixels of the imaging sensor 500 (see FIG. 2) and the number of pixels in the reconstructed image. Assuming reasonably uniform distribution (on average) of incident radiation on imaging sensor 500, one would want 2× as many pixels at the imaging sensor for an imaging method that recovers amplitude and phase. Another factor of 2 or larger is necessary to break the symmetry of an object and its complex conjugate. Thus the target region on the object typically has, at most, ¼ of the number of pixels of the imaging sensor.

Note that this relationship holds when the pixel scale of the imaging sensor 500 matches the scale of features of the radiation pattern incident upon it. Namely, the radiation incident on the imaging sensor should roughly cover the imaging sensor and have its significant scales resolved by the pixel scale. This requires that the object illumination should correspond to the resolvable area. If the imaging sensor is an N×N pixel array, then the resolvable area is roughly an M×M square where $M=N/2\times(k\lambda/NA)$. For a $\lambda=13.5$ nm EUV beam with k=0.5, NA=0.125, and a 4K×4K imaging sensor, the resolvable area is roughly 110 μm square, with the resolution element 54 nm, or 13.5 nm after 4× demagnification at the wafer.

Implicit in this analysis is that the imaging sensor is sized to capture essentially all of the diffracted light and its pixels are sized accordingly so they properly sample the diffraction pattern. Analyses of the appropriate sizes and sampling for the object, wavelength, imaging sensor, and its pixel pitch that elaborate on these rules of thumb have been outlined in several publications (see (i) Huaying Wang; Dayong Wang; Jianjun Xie; Shiquan Tao; Recording conditions of digital holography. Proc. SPIE 6279, 27th International Congress on High-Speed Photography and Photonics, 62791J (Jan. 11, 2007); doi:10.1117/12.725187; and (ii) Jorge Garcia-Sucerquia, Wenbo Xu, Stephan K. Jericho, Peter Klages, Manfred H. Jericho, and H. Jürgen Kreuzer, "Digital in-line holographic microscopy," Appl. Opt. 45, 836-850 (2006) https://doi.org/10.1364/AO.45.000836), which publications are hereby incorporated herein by reference. Their conclusions for a well designed system match the aforementioned relationships but may differ slightly based on the definition of resolution, e.g., the "k" constant in kλ/NA.

In order to match the scale of the radiation incident on the imaging sensor 500 to the size of the imaging sensor, one could set the distance from the object (i.e., mask 300) to the imaging sensor accordingly. However, a more compact system results when the radiation incident on the imaging sensor is an expanding beam, as shown in FIG. 2. In general, an expanding beam can be produced by a positive (focusing) or negative optic that is either transmissive or reflective. However, to simplify the data processing, the illuminated region should be restricted to the resolvable area. For efficient use of the illuminating beam, it should just cover the resolvable area.

This last consideration makes it preferable to use a transmissive optic to convert the coherent EUV beam to a diverging beam, due to the short focal distance for a reasonably large NA. It is easily appreciated that a reflective optic would likely interfere with the mask since it must have a focal length <1 mm given the typical beam diameter and required NA for high resolution. Although conventional transmissive optics are not available for EUV and SXR wavelengths, transmissive diffractive optics are available for EUV and SXR wavelengths and are discussed below.

In order to generate the two interfering beams (i.e., the first beam 202 which illuminates the object and the second, different beam 204 which interferes with first beam 202 at imaging sensor 500), it is not possible to directly adapt the methods used at longer wavelengths (e.g., DUV wavelengths) for use at EUV wavelengths. The transmissive optics and beamsplitters normally used at longer wavelengths do not exist for 13.5 nm EUV beams. Instead, a novel approach that uses relatively simple optics which are practical for use at 13.5 nm is used. An exemplary optical system is shown in FIG. 2.

A coherent beam 206 is directed with a planar reflector (fold mirror) $R_1$ to a transmissive optic, a zone plate 208. A zone plate is the only transmissive element available at the EUV actinic wavelength. This is not an ordinary Fresnel zone plate (FZP) with concentric zones. Instead, it is a compound optic (i.e., a compound zone plate) that forms two off-axis converging (focused) beams. One beam $U_0$ (i.e., first beam 202) illuminates a portion of the mask (the region being imaged). The second beam $U_1$ (i.e., second, different beam 204) is a reference beam which is directed by fold mirrors $R_2$, $R_3$ so that it does not reflect off the mask. The mirrors $R_2$, $R_3$ are arranged so that the two beams $U_0$ (i.e., first beam 202) and $U_1$ (i.e., second, different beam 204) have identical path lengths when they overlap and interfere at the detector plane (i.e., at imaging sensor 500). Due to the small wavelength, the angle between the two beams $U_0$ and $U_1$ must be small in order to produce fringes that can be resolved by the imaging detector. This is required by the path length requirement $$d \sin \theta = \lambda \quad (3)$$

where d is the lateral spacing between adjacent fringe maxima, θ is the angle between the beams, and λ is the wavelength. At the Nyquist sampling limit, d is 2× the detector pixel spacing. For 3 μm pixels, the angle is 2.25 mrad or 0.129 degrees. For 1 μm pixels, which may be close to the practical lower limit that can be fabricated and has sufficient well depth, the angle is 6.75 mrad or 0.387 degrees. The requirement to form the two interfering beams $U_0$ and $U_1$ with this small angle presents a challenge for this approach. For expanding beams with nearly spherical wavefronts, the relevant angle is the angle between the two virtual point sources of the spherical wavefronts as viewed from the imaging sensor 500.

That challenge is reflected in the layout shown in FIG. 2. The mask 300 is positioned in the converging illumination beam $U_0$ (i.e., first beam 202). In the mask plane, a circular region is illuminated. The beam amplitude is multiplied by $P_M$, the complex reflectivity of the mask pattern, and becomes $U'_0$. The illumination beam 202 goes through focus after reflection by the mask 300, as can be seen in the detailed inset A (circle). The reference beam $U_1$ (i.e., second, different beam 204) is reflected by mirror R2 so that it crosses the illumination beam $U_0$ and also goes through focus after this reflection. The reference beam $U_1$ crosses the illumination beam near that beam's minimal width in order to make room for mirror R3 which directs the reference beam $U_1$ towards the detector (i.e., imaging sensor 500).

With analogy to digital holography, the first (illuminating) beam $U_0$ is the object beam which encodes the information about the region being imaged. The second beam $U_1$ is an off-axis reference beam. At the detector plane, the object beam is a diffracted transformation of the illuminated object with an expanding spherical wavefront. The reference beam is also an expanding spherical wavefront. The two beams $U'_0$ and $U_1$ interfere at the detector to form a fringe pattern. If the mask (object) 300 is a perfect planar mirror, the interference fringes are those of two overlapping spherical waves. If the mask (object) 300 has a pattern with varying complex reflectivity (modulus and phase), the fringes are modulated by the object diffraction pattern.

Figure 3:
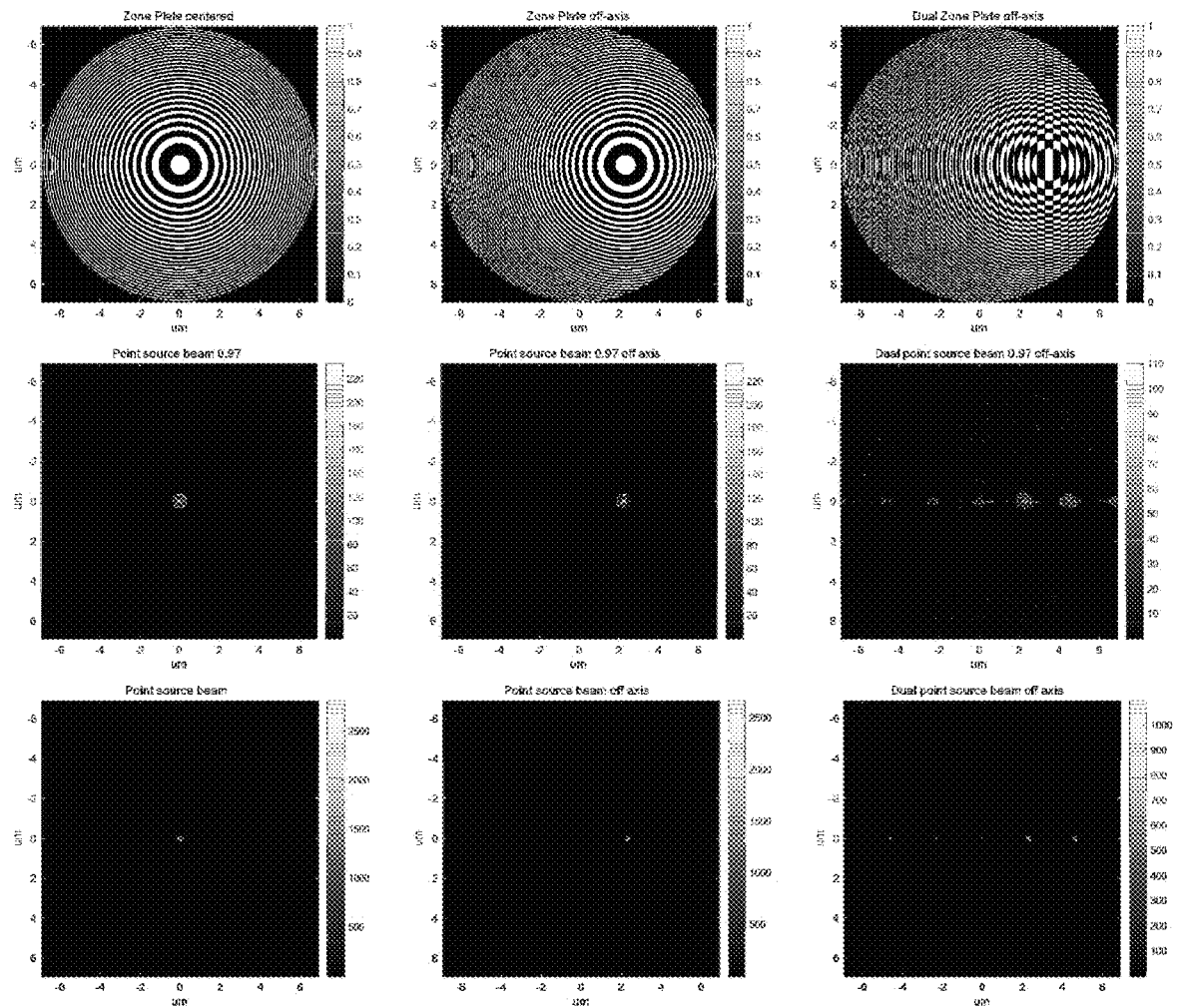
FIG. 3 shows exemplary plots of on-axis, off-axis, and compound Fresnel zone plates (FZPs) along with resulting images of focused beams at the focal distance and at 0.97× the focal distance.
Figure 4:
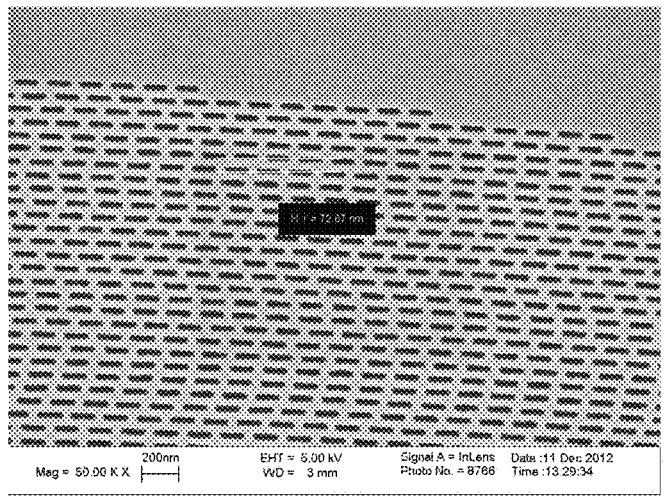
FIG. 4 is an image of a portion of a FZP designed for EUV imaging.

For these EUV and SXR wavelengths, FZP optics, a type of diffractive optic that typically has two (binary) values, can be fabricated to provide the desired zone plate 208. An FZP (see FIGS. 3 and 4) has alternating concentric rings (zones) of transmissive and opaque material. Since any substrate with sufficient mechanical stability has poor transmission at EUV and SXR wavelengths, FZPs for these wavelengths are constructed like a stencil. Typically made with a thin metal foil, the transmissive zones consist of arc-like perforations (holes) in the foil which follow the circular pattern except for some supporting ribs as is seen in FIG. 4 (see Goldberg et al., "Commissioning an EUV mask microscope for lithography generations reaching 8 nm," Proc. SPIE 8679 (2013)).

For an ideal FZP, the spot size is typically quite close to the width of the outermost zone. The spot size limits the spatial coherence of the illuminating beam and hence the resolvable spot size of the reconstructed object. In order to produce as fine a pattern or spot size as possible, the metal foil FZP lens is formed by milling the foil using a focused ion beam (FIB) in order to produce the perforations. The resolution and accuracy of the FIB are critical to fabricating an FZP that shapes the beam properly. Some FIB instruments are capable of producing geometries that are accurate on scales ranging from 1 nm-10 nm.

The FZP efficiency can be defined as the fraction of the incident radiation that is directed as intended. For a focusing lens, that would be the fraction of the beam contained within the primary or first order spot. The diffraction order is defined as the average phase step from one transmission zone to the next in waves. Thus the zero-order is the undiffracted beam. The first order is the one where the average phase difference from one zone to the next is one wave, and so on. According to diffraction theory, a certain fraction or percentage will diffract into the different orders.

For a zone plate that is 50% opaque, efficiency cannot be greater than 50%. Since this type of diffractive optics will diffract light into orders other than the desired one, typical diffraction efficiency into the first order is 5-30%. While that results in the loss of the majority of the coherent EUV beam, it does focus part of the collimated beam and result in a diverging beam after the focus. The object 300 (i.e., the mask or mask blank) can be positioned along the optical axis so that the size of the illuminated area is close to the resolvable size of the object. Even with diffraction losses, this approach can be significantly more efficient than one that does not use optics to shape the beam. For example, it can be much more efficient than if a large, collimated beam was incident on a small object and required a masking aperture.

FZP optics offer flexibility that is difficult to achieve with more conventional optics. Namely, it is simple to add a tilt to the beam diffracted by an FZP in order to steer the beam in a particular direction. This distorts the centrosymmetric zone pattern to one that is symmetric about the projection of the tilted beam, as shown in FIG. 3. In addition, FZP optics enable simple fabrication of a compound lens where the original beam is divided into multiple beams, each of which can have a different focal length and beam angle.

The design of the FZP used for zone plate 208 is straightforward once the phase of the beam entering and exiting the FZP has been defined. The boundaries between zones are defined by locations where the optical path length of the rays connecting source and destination change by a multiple of $\lambda/2$. The design algorithm for beams that focus to, or expand from, a point source is as follows:

1. Identify the point source(s) location(s) and relative magnitude(s). Over the area of the planar (usually circular) zone plate, calculate the sum of the complex amplitude of the spherical wave(s) from the point source(s), where $$U(r_0) = \frac{U_0 e^{ikr_0}}{r_0} \quad (4)$$

is the complex amplitude of such a spherical wave, in order to calculate the complex amplitude required to produce those spherical wave(s).
2. If the beam incident on the FZP is not a plane wave, multiply the result by the complex conjugate amplitude of the input wave, in order to cancel the phase of the incident beam.
3. Select regions with phases that range over an interval $[\theta, \theta+\pi)$ where $\theta \in [0, 2\pi)$. Set those regions to amplitude 1 and all others to 0.
4. Adjust the design so it can be fabricated in a self-supporting fashion.

FIG. 3 shows examples of on-axis, off-axis, and compound off-axis FZPs for plane wave beams generated with the method outlined above. The plates are all defined over a 512×512 array corresponding to 13.8 μm×13.8 μm with a sampling grid of 27 nm. The point sources are all 65.8 μm distant from the FZP. The off-axis points are designed to be 2.30 μm and 4.59 μm from the center of the array along the x axis. The plates were designed for $\lambda=13.5$ nm. Using these parameters, spherical waves incident on the FZP plane were calculated and binarized as in steps 1-4 above.

The effect of these ideal FZPs can be calculated using scalar diffraction using the angular spectrum method (See J. W. Goodman, Introduction to Fourier Optics, 2nd ed., McGraw-Hill, 1996). Using that method, it is straightforward to calculate the diffraction spot at a given distance from the FZP. FIG. 3 shows calculated spots at 0.97× the focal distance and at the exact focal distance. The spots in the focal plane are quite compact.

As expected, the spot in front of the focal plane (the middle row) shows a larger spot as the beam has not yet reached the focal plane. Also, as expected, the center of mass of the spot moves in the x direction with increasing distance. The centroid of the spot in the middle row plots has not yet reached the designed position.

Binary diffractive optics are not very efficient. Roughly half the incident beam is blocked and significant portions of the transmitted beam are scattered into other orders. The angular spectrum propagation gives a first-order estimate of the diffraction efficiency of the FZP as the energy in the central spot. For the centered, off-axis, and dual off-axis examples in FIG. 3, the calculated efficiencies are 9%, 9%, and 7.5% (the total of both spots), respectively. A better estimate would require sampling the FZP with higher resolution and/or including vector diffraction effects but is not critical to engineering an APMI system since a safety factor can be built into the beam power.

Note that the design algorithm does not explicitly account for the stencil process. The shape of the stenciled holes and the fraction of open area are variables that will affect the quality of the beams $U_0$ and $U_1$ emerging from the zone plate 208. It is straightforward to calculate the scalar diffraction of a particular design rule for the stenciled holes and assess its performance. It may be useful to use iterative algorithms similar to those used to design phase plates that propagate the beam(s) between the plane of the zone plate (i.e., FZP 208) and one or more other planes, applying constraints on the amplitude or phase in each plane, to design the stenciled holes (see "Three-plane phase-only computer hologram generated with iterative Fresnel algorithm," M. Makowski; M. Sypek; A. Kolodziejczyk; G. Mikula, Opt. Eng. 44(12), 125805, Dec. 29, 2005).

Several aspects of the optical system shown in FIG. 2 relate to the practicality of assembling the device. For simplicity, the beam 206 emitted by EUV source 100 is shown as perfectly collimated, turned by fold mirror R1 and split into two beams $U_0$ and $U_1$ (i.e., first beam 202 and second, different beam 204) by the compound FZP 208. However, as the size of the FZP is likely to be limited by strength of the foil and time/expense to machine it with a FIB, it may be useful for $R_1$ (or another upstream mirror) to partially focus the beam 206 so that beam 206 is small when it encounters the FZP 208.

The system in FIG. 2 requires at least two mirrors (i.e., mirrors R2 and R3) to redirect the reference beam $U_1$ (i.e., second, different beam 204). This is necessary to both clear the edge of the FZP 208 and to equalize the path length of each beam to the detector (i.e., imaging sensor 500) in order to keep them sufficiently coherent so the interference pattern has good contrast. This is challenging as the separations are fairly small. For the imaging scenario in FIG. 2 with 0.1 NA beam and angle of 0.7 mrad between the beams, R2 and R3 are separated by ~200 μm and they sit ~100 μm off the mask 300. Note that both beams come to focus after reflection by the mask 300 and mirror R2. This maximizes the clearance for mirror R3 so that it does not interfere with the illuminating beam $U_0$ (i.e., first beam 202). The clearance is also increased with increasing angle between the interfering beams.

FZPs diffract some light into the first (desired) order and some light into the zero (undiffracted) order and into higher orders. Most optical systems with an FZP include an order sorting aperture near the focus of the desired (first) order to absorb light from the other orders. For a reflective dual beam system such as that shown in FIG. 2, there is no natural place for an order-sorting aperture. For the system in FIG. 2, the opening between mirrors R2 and R3 in conjunction with some absorbers can serve to eliminate most of the light in other orders. The fabrication of the optical assembly can be challenging since the clearance from the bottom end of mirrors R2 and R3 to the mask 300 is small.

One possibility is to fabricate a pyramidal assembly with the inside surface having reflective regions near the tip of the pyramid corresponding to mirrors R2 and R3 which are shown in the detailed inset A (circle) in FIG. 2. These mirrors are shown schematically with small thickness. An actual pyramidal assembly will likely have greater thickness and may require a reverse bevel so it does not hit the mask. A small clearance hole close to the mask could then be drilled with an ultrafast laser since that is a gentle way of removing the material for the hole. The inside surfaces of the assembly except for the reflecting surfaces should be EUV-absorbing, thereby absorbing most of the light from other orders.

The optical system in FIG. 2 has two reflections for the reference beam $U_1$ (i.e., off mirrors R2 and R3) and one reflection for the illumination beam $U_0$ (i.e., off mask 300). Thus, the handedness or parity of the two beams $U'_0$ and $U_1$ are not the same and, in particular, the two beams $U'_0$ and $U_1$ are flipped in x. This could increase the spatial coherence requirements of the beams. Other mirror systems are possible which have two reflections for both beams. Such configurations may ease the coherence requirements but have less clearance than the configuration shown in FIG. 2. Moreover, adding additional optical elements can reduce the throughput, requiring greater beam power, and may add aberrations.

Figure 2A:
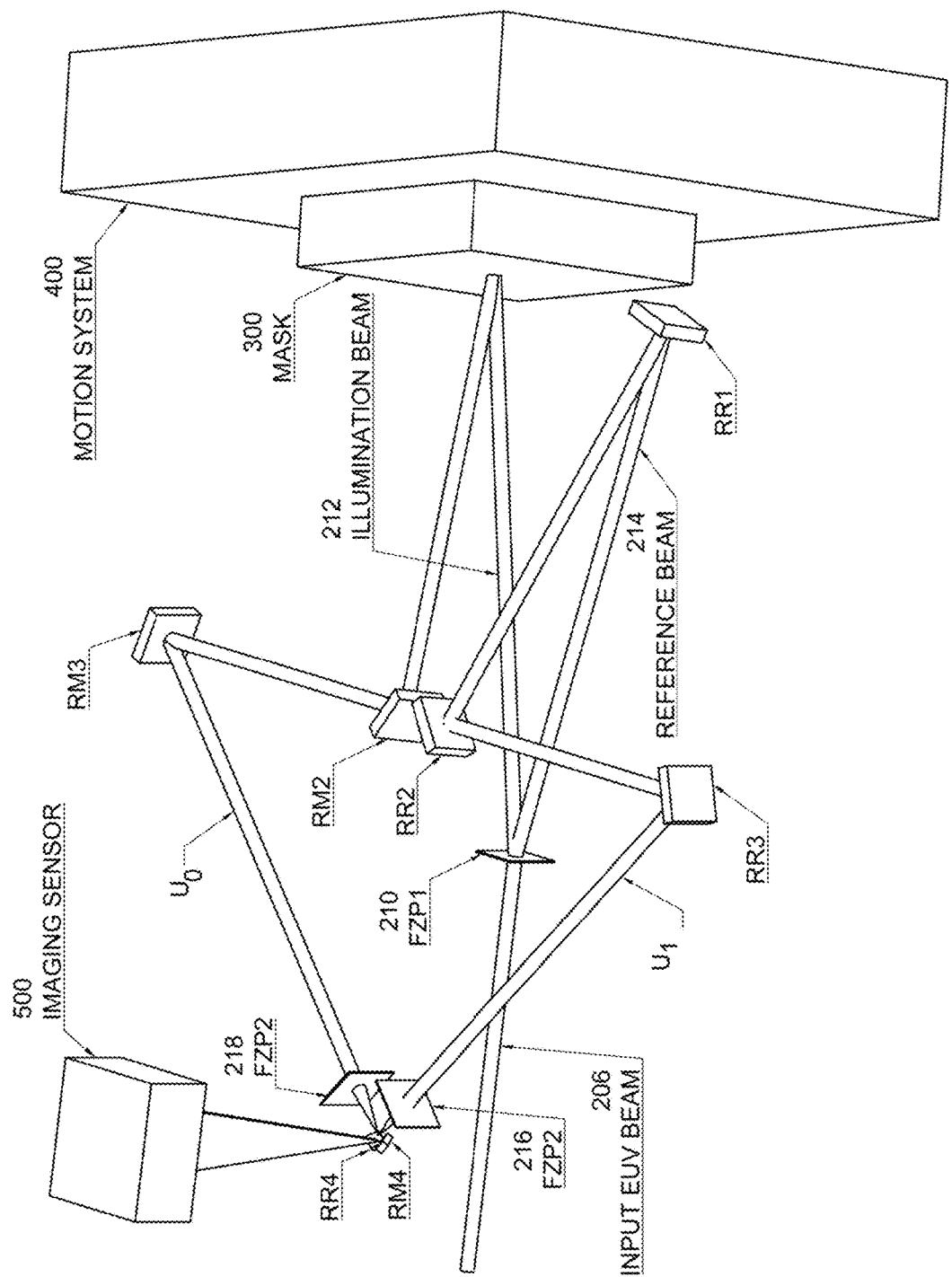
FIG. 2A is a schematic view of an alternate optical system formed in accordance with the present invention.

Another variation of the optical system 200, shown in FIG. 2A, may also have some advantages. For example, it is desirable for the optical system to work with an EUV mask having a pellicle. A pellicle is a very thin transparent window positioned off the mask surface and parallel to the mask surface. It serves as a dust shield so dust particles which would otherwise fall onto the mask fall on the pellicle instead. Since the dust particles are not in the mask plane, they are out of focus when imaging onto the semiconductor wafer and do not spoil the lithographic pattern. In order to inspect a mask with a pellicle, a nearly collimated beam must illuminate and reflect off the mask. This beam may be designated as the propagated complex mask pattern (PCMP).

The optical system shown in FIG. 2A accomplishes this as follows. A nearly collimated coherent EUV beam 206 is split by a first FZP 210, which may be a diffraction grating, into two beams, a reference beam 214 and an illumination beam 212 for illuminating the mask 300. The reference beam 214 reflects off a mirror RR1 and the illumination beam reflects off the mask 300. The mirror RR1 and mask 300 are inclined so the beam reflects out of the initial plane defined by the beams. The beams are reflected off additional mirrors, RR2, RM2, RR3, RM3 (where the 2nd letter refers to the Reference or Main illumination beam, respectively). For convenience, these mirrors guide the beams in a plane that is parallel to the initial plane and offset normal to the initial plane until they are due to cross at 90 degrees to each other.

Just before the beams cross, they are focused by identical FZP lenses 216 and 218. This is done to minimize their cross-section so they can cross and be reflected towards the imaging sensor and to form an expanding beam to match the size of the imaging sensor. The final two mirrors, RR4 and RM4 are inclined to reflect the beams normal to the initial plane towards the imaging sensor 500. Similar to FIG. 2, these mirrors have a small reflective area in order to reduce reflections from other diffraction orders that are directed towards the imaging sensor.

With the approach shown in FIG. 2A, because each beam passes through two diffractive elements, this approach has greater diffraction losses than the system shown in FIG. 2. Each beam is also reflected by multiple mirrors which also reduces the light throughput. The optical system shown in FIG. 2 is believed to be the most optically efficient configuration with the fewest elements.

Both the optical system shown in FIG. 2 and in FIG. 2A provide essentially equal path lengths for both the illumination beam and the reference beam. This is required in order to maximize the coherence of the interfering beams and hence the contrast of the DI. The relative path lengths of the expanding illumination and reference beams also affect the interference pattern, which may affect the algorithm used to recover the mask pattern.

Another aspect of the construction shown in FIG. 2 is that the illuminating beam is shown inclined relative to mask 300 but square to the detector (i.e., imaging sensor 500). This can introduce some keystoning and also complicate the back propagation to recover the complex mask reflectivity (CMR). The detector can be tilted so it is parallel to the mask, which should eliminate the keystoning and simplify back propagation. However, that introduces path length differences across the detector (i.e., imaging sensor 500). These path length differences could impose more stringent coherence requirements on the input EUV beam than if the mask were normal to the beam. Engineering analysis is required to identify the tradeoffs resulting from the beam reflecting off the mirror at an angle and generate a design that produces the highest quality images.

The design discussed uses a 0.1 NA beam to illuminate the mask. It is possible to increase the NA and hence improve the native resolution of the system. This will require finer resolution for the FZP and may reduce the clearance for the mirror assembly. The practical limit for the beam NA will depend on the engineering details.

It will be appreciated that optical configurations other than those shown in FIG. 2 and FIG. 2A may be used to produce the interfering beams at the imaging sensor 500. For example, a system designed for transmissive objects will have some of the same constraints as one designed for reflective objects, e.g., that the two beams must be inclined by a small angle at the imaging sensor. However, that system must have the beams well separated when they pass through the transmissive object. An exemplary system would use a linear diffraction grating, either reflective or transmissive, to produce beams at angles to each other and select 2 orders, e.g., +1 and −1, while blocking all other orders. Using flat mirrors, one beam would be directed through the transmissive object and the other around the object.

The beams could then be recombined with one of two techniques. With the first technique, a second diffraction grating could be used to direct each beam by the same diffraction angle. If one beam is incident at an angle that differs by a small angle from the other beam, the diffracted beams would differ by that same small angle at the imaging sensor.

The second technique resembles the system shown in FIG. 2A. After the illumination and reference beams have been directed through the transmissive object and around it, respectively, both beams could be focused with FZPs lenses similar to 216 and 218 and directed by mirrors towards the imaging sensor. As with the optical system of FIG. 2A, the beams must be close together at the reflection point so they are directed towards the imaging sensor at a small angle to each other.

Motion System 400

In discussing the motion system, the optical axis shall be referred to as the Z axis and the plane perpendicular to the Z axis shall be referred to as the X-Y plane. The mask inspection system translates the mask relative to a fixed illumination and imaging system with a precision motion system 400. The motion system 400 uses an X-Y table which must be fast and accurate enough to reliably move the mask 300 so that the entire surface can be imaged. DUV inspection tools typically use time delay integration (TDI) sensors. These systems continually translate the table in the fast scanning direction at a uniform speed while continually shifting the image signal across the sensor. The motion and readout systems are slaved so each pixel output of a given row of the sensor corresponds to a single pixel on the mask.

An EUV inspection system is designed to image smaller pixels at the mask than a DUV system. To inspect the same area in the same amount of time, the average pixel readout rate must increase by the ratio of the pixel areas. For an EUV system using TDI imaging sensors, the requirements to coordinate the motion and readout so that there is no smearing of the pixel data must have higher bandwidth and accuracy than for a DUV system. In addition, the focus tolerance for the mask position along the optical axis is much tighter due to reduced depth of focus for the same NA.

An EUV inspection system that does not use continuous scanning (i.e., does not use a TDI sensor) has to reposition the mask in between each exposure. Although each move is a short distance, the motion system 400 must have sufficient acceleration to move and settle the mask in a fraction of the ~38 ms per exposure. This imposes significant requirements on the acceleration and settling time of the motion system, as discussed below. In addition, the position readout must be better than the resolution target and the readout timing must be slaved to the position. There are stages whose published specifications are close to the required acceleration and accuracy, and their applicability to the required motion profile is discussed below.

Some aspects of the motion system other than its X-Y motion may affect its suitability for inspection. For example, motion in one direction could result in displacement in another direction, i.e., motion of the X-Y stage may displace the payload in the Z direction (that is, along the optical axis). If the non-flatness is too large, it may need to be compensated by some other part of the system.

Figure 5:
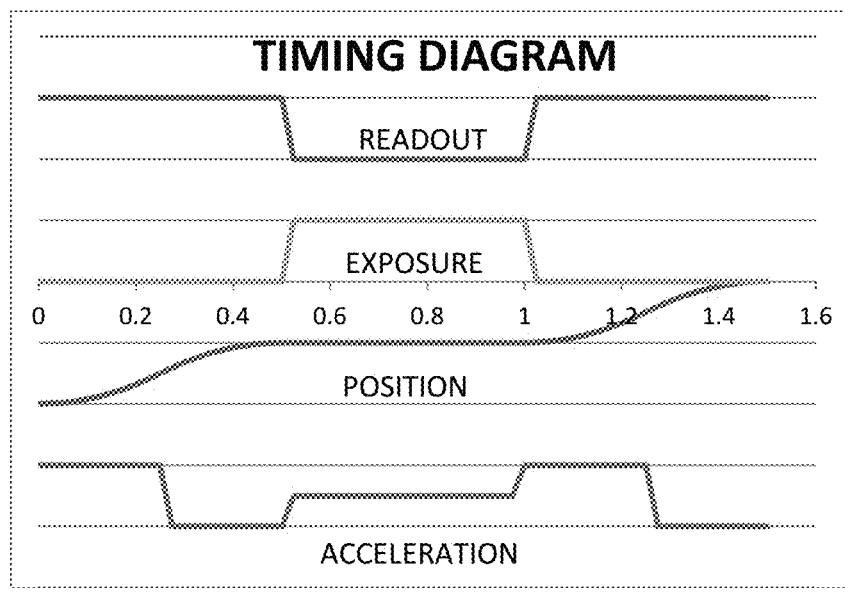
FIG. 5 is an exemplary timing diagram showing the sequence of exposure, readout, linear position of the mask and its acceleration when obtaining a sequence of images across the mask.

The EUV mask size, required resolution, and frame rate impose requirements on the motion system for APMI. Consider the nominal imaging specifications: an EUV mask with 132 mm×104 mm useful area and a system which images a separate 110 micron square region with each exposure with 54 nm resolution. This system requires 1.12 million exposures to cover the mask. If an inspection takes 12 hours, this requires 1 image every 0.038 s, a 26 Hz image rate. If half that time is spent performing the exposure and half that time is spent moving the mask relative to the optics, each move happens in 0.019 s. A representative timing diagram for the motion system 400 is shown in FIG. 5.

Assuming the motion profile is constant (maximum) acceleration for the first ½ of the move, followed by constant (maximum) deceleration for the second ½ of the move, the mask must accelerate at 1.21 m/s$^2$, or 0.12 G where G is the acceleration of gravity. The maximum speed attained at the midway point is 11.6 mm/s. This can easily be achieved by existing stages from manufacturers such as Newport and Dover Motion. For example, the Newport DynamYX® DATUM® Ultra-High Performance Air Bearing Stage has 25 nm repeatability, 200 nm accuracy, accelerates at 3 G in one horizontal direction and 5 G in the other, and has a maximum speed of 1000 mm/s.

A specification that can be more difficult to meet is the requirement for the stage to settle within the resolution limit. Although there does not appear to be an off-the-shelf system with published specifications for performing the required motion and rapidly settling within a few nm, there are systems which are close, such that it is clear that a customized system meeting all the specifications can be produced (see B. Kramer, NanoPWM, January, 2016 https://www.acs-motioncontrol.com/presentations).

Imaging Sensor 500

In order to generate a high signal-to-noise ratio (SNR) estimate of the CMR, the DI must recorded with high fidelity. As noted above, the effective angle between the interfering beams $U_0$ and $U_1$ varies inversely with the pixel size. Smaller pixels and a larger angle relax some of the constraints on the optical system 200.

Conversely, the requirement to record the intensity with high SNR leads to increased pixel size inasmuch as the pixel well depth typically increases with size. Consider a scenario where the average illumination is 50% of the pixel well depth. Each EUV photon, with energy 91.84 eV, produces 27 electrons when detected in silicon. For a well depth of 200,000 electrons (e), each pixel detects 3703 EUV photons, on average. Due to Poisson statistics of the detection, on average each pixel has shot noise of $\sqrt{3703}$=61. This yields an average SNR of 61.

The required beam power can be estimated. Assuming a 200,000 e$^-$ well depth, 50% average illumination, a 4K×4K array, and a 7.5% efficiency of the zone plate 208, each exposure requires 7.61E13 eV or 1.22E-5 Joules. With the 26 Hz image rate and a 50% duty cycle for useful illumination (while the mask is stationary), this requires 0.63 mW of coherent EUV power.

Existing imaging detectors with suitably small pixels may not have large enough well depths to provide the desired SNR. However, techniques exist for fabricating a detector with 4.5 μm pixels with 150,000 e$^-$ well depths (see Mizobuchi, K. et al 4.5 μm Pixel Pitch 154 ke$^-$ Full Well Capacity CMOS Image Sensor. In Proceedings of the International Image Sensor Workshop, Bergen, Norway, 25-28 Jun. 2009; pp. 235-238). Therefore, a custom detector can be constructed for an APMI system which would provide the desired SNR.

According to the nominal scenario described above, with 26 4K×4K exposures per second and each pixel having 16 bit readout, the imaging sensor must deliver 872 GB/s. Assuming equal times to expose and read out the sensor, the data rate is 1.745 TB/s. Both the array size and readout rate are well within industry capabilities as exemplified by 4K HDTV imaging sensors, e.g., the Sony sensor in the HDC-4800 camera with ~8 Mpixels can be read out at 480 frames per second (fps) which is equivalent to 4 Gpix/s.

Algorithm 600

There are a variety of means to form an image of the mask which is efficiently illuminated by a coherent EUV beam. For example, imaging optics, e.g., a FZP or reflective imaging optics, could be used to form a conventional image of the mask 300 onto imaging sensor 500. This approach is straightforward, but does not readily lend itself to easily imaging phase defects or scanning the entire mask without experiencing focus shifts. A preferred embodiment of the present invention uses the following algorithm.

The imaging sensor or detector 500 records the intensity image of the interference pattern of the two beams $U_0$ and $U_1$, which is denoted as the diffraction image (DI). To understand how the image of the mask reflectivity is recovered, consider the amplitude (Eq. 5) and intensity (Eq. 6) of coherent beams incident on the detector, given by the following equations:

$$U_D(r) = U'_{0D}(r) + U_{1D}(r) \quad (5)$$

and $$I_D(r) = I_{0D}'(r) + I_{1D}(r) + U'_{0D}(r)U_{1D}^*(r) + U_{0D}^{*\prime}(r)U_{1D}(r) \quad (6)$$

where $U_D$ is the complex amplitude at the detector and I represents the intensity due to the illuminating beam (0), reference beam (1), after propagation, with the apostrophe ' indicating that reflection by the mask has modified the beam.

Taking the Fourier transform of Eq. 6 gives the following:

$$\mathcal{F}\{I_D(r)\} = \mathcal{F}\{I_{0D}'(r)\} + \mathcal{F}\{I_{1D}(r)\} + \mathcal{F}\{U_{0D}'(r)U_{1D}^*(r)\} + \mathcal{F}\{U_{0D}^{*\prime}(r)U_{1D}(r)\} \quad (7)$$

The first two terms are centered around zero frequency, as they are the Fourier transform of the autocorrelation of the amplitudes of the two beams. The next two terms are Fourier transforms of the cross-terms and can be separately recovered if the two beams are properly designed.

To see this, consider the ideal case where the mask is a perfect mirror ($P_M=1$) and the two beams are nearly plane waves at the detector, so they are approximated as follows:

$$U_{0D} = A_0 e^{-ik_0 x}$$

$$U_{1D} = A_1 e^{ik_0 x} \quad (8)$$

where $k_0 = 2\pi \cos\theta/\lambda$ is the angular spatial frequency for a beam inclined (symmetrically in x) by $\theta$ from the normal to the detector and without loss of generality $A_0$ and $A_1$ are real.

The first two terms of Eq. 7 reduce to the Fourier transform of a constant, which is a delta function at zero frequency. To evaluate the next two terms, use the relation $$\mathcal{F}\{e^{-ik_0 \cdot r}\} = \delta(k+k_0) \quad (9)$$

and the convolution theorem, which states that the Fourier transform of a product of functions is the convolution of the Fourier transform of the functions, $$\mathcal{F}\{fg\} = \mathcal{F}\{f\} \otimes \mathcal{F}\{g\} \quad (10)$$

For the beams in Eq. 8, Eq. 7 reduces to $$\mathcal{F}\{I_D(r)\} = A_0^2 \delta(0) + A_1^2 \delta(0) + A_0 A_1^* \delta(k+2k_0 \widehat{k_x}) + A_0^* A_1 \delta(k-2k_0 \widehat{k_x}) \quad (11)$$

Thus, the contribution from the interference terms has been shifted to $\pm 2k_0 \widehat{k_x}$. This result is equivalent to the fact that the plane waves interfere to produce a perfect sinusoidal fringe pattern with $$I_D(r) = A_0 + A_1 + 2A_0 A_1 \cos(2k_0 x) \quad (12)$$

For the case where the mask has a pattern, Eq. 7 becomes $$\mathcal{F}\{I_D(r)\} = A_0^2 \delta(0) + A_1^2 \delta(0) + A_0 A_1 \tilde{\mathcal{P}}(k+2k_0 \widehat{k_x}) + A_0 A_1 \tilde{\mathcal{P}}^*(k-2k_0 \widehat{k_x}) \quad (13)$$

where $\mathcal{P}$ represents the propagated complex mask pattern (PCMP) in the detector plane and $\tilde{\mathcal{P}}$ is its Fourier transform. In this case, the Fourier transform of the PCMP or its conjugate are shifted to $\pm 2k_0 \widehat{k_x}$.

The method of recovering the mask pattern is straightforward (see M. Liebling, T. Blu, and M. Unser, "Complex-wave retrieval from a single off-axis hologram," J. Opt. Soc. Am. A 21, 367-377, 2004). The Fourier transform of the detector intensity image is calculated. The regions of the transform around zero frequency and the positive frequency $2k_0 \widehat{k_x}$ are zeroed (masked off). The remaining region around the negative frequency $-2k_0 \widehat{k_x}$ is inverse transformed to recover the propagated mask pattern. This recovery algorithm is termed Fourier-masking (FM) which produces an estimate of the PCMP. The PCMP estimate is then back-propagated to the mask plane which produces an estimate of the complex mask pattern $P_M$ which is denoted as the complex mask reflectivity (CMR).

Once a given area of the mask has been imaged, the mask can be translated (i.e., moved) parallel to its surface to image a different area of the mask. A series of DIs are recorded and processed to produce the corresponding CMRs. The CMRs can be stitched together to estimate the complex reflectivity of the entire mask pattern.

For an optical system like that of FIG. 2, the two beams are expanding spherical waves with finite extent, not the plane waves of Eq. 8. This changes the result in Eq. 13 in several ways. First, the first two terms are no longer delta functions. Instead, they are the Fourier transform of the autocorrelation of the beams. Due to the finite extent of the beams, the Fourier transform of the propagated mask pattern is now convolved with a function having some width, so the propagated mask pattern recovered by the FM algorithm is slightly degraded. However, if the beams roll off smoothly, the distortion of the CMR is only on the large scale of the beam roll off.

A more significant change is that the interfering spherical waves deviate from the ideal plane waves and produce hyperbolic fringes. With increasing NA, the fringes (from a flat mask) increasingly deviate from linearity. The requirement to have high resolution at the mask drives the NA to be as large as possible. As is illustrated below, the effect of non-linear fringes can significantly degrade the resolution of the PCMP and the back-propagated CMR. However, there is a technique that significantly mitigates this effect.

The recovery algorithm performs two major calculations. The first is the FM estimate of the PCMP. The second is the back-propagation of this result to the mask plane to estimate the CMR. As these estimates of the mask reflectivity and the wafer exposure are numerical calculations, they can accommodate certain types of instrument variation more easily than conventional aerial imaging. For example, parameters such as the longitudinal (focus) position of the mask become software parameters that can accommodate variations as the mask is translated (i.e., moved) to image the entire surface.

The estimate of the CMR is the main result of APMI. It can easily be compared with the designed mask pattern (amplitude), inspected for particles and other defects, and the phase can indicate how well the mask matches the ideal flat phase which mask blanks are meant to produce. However, an additional calculation must be performed to produce a result like that of aerial imagery. The complex reflectivity must be used with a model of the exposure tool to calculate the intensity at the wafer. This process is not the same as directly measuring the aerial image but it can be more powerful. To the extent that there are parameters of the exposure tool which can be varied, or if aberrations of a particular exposure tool are known, this approach can predict the aerial image with a particular set of exposure parameters or a particular exposure tool.

According to the discussion above, this is the basic algorithm for recovering the CMR:
1. Take the fast Fourier transform (FFT) of the DI.
2. Zero out (mask off) the regions of the transform around zero frequency and the positive frequency $2k_0 \widehat{k_x}$.
3. Take the inverse FFT to recover the PCMP.
4. Back propagate the PCMP to estimate the CMR.

Figure 6:
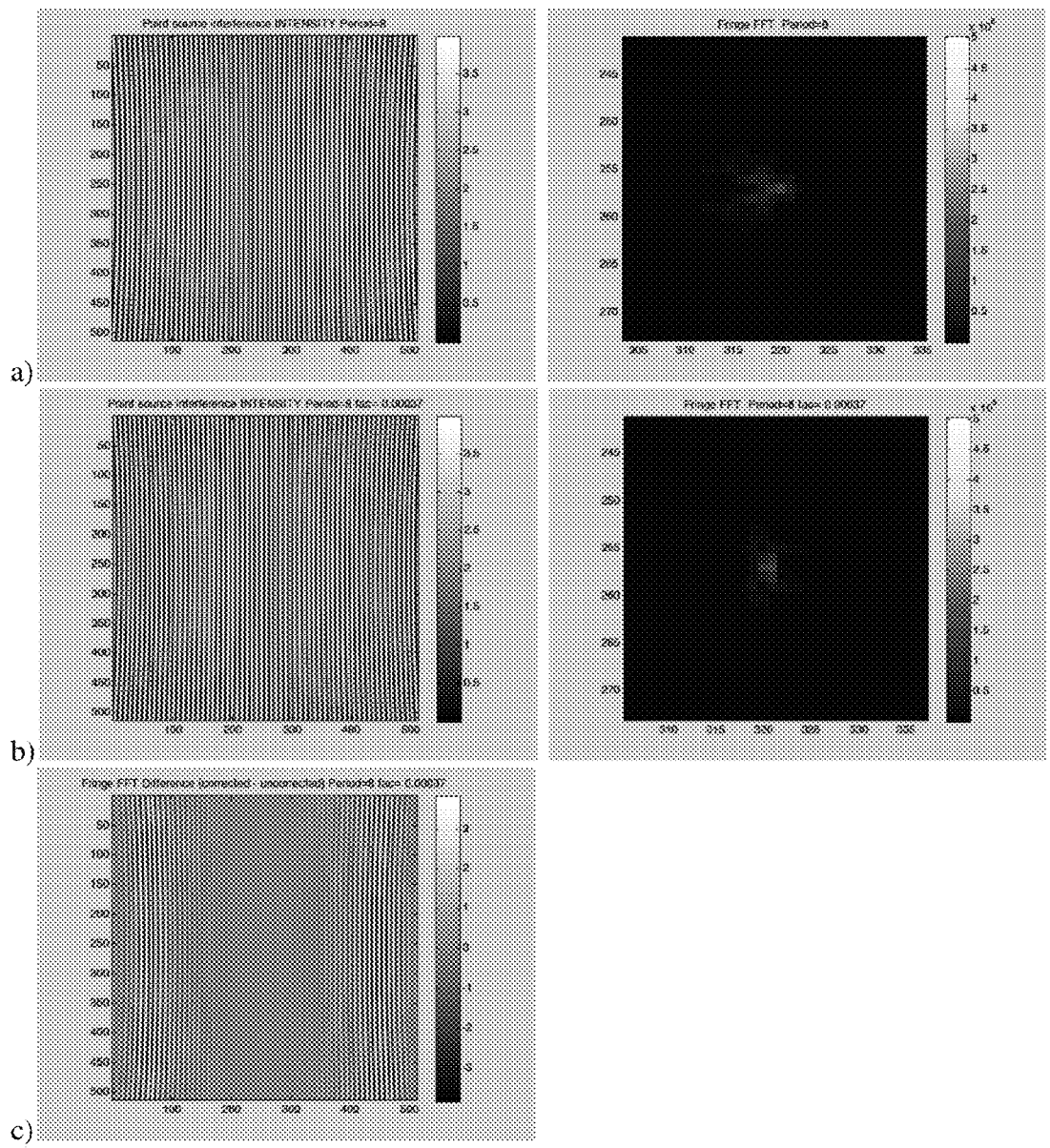
FIG. 6 shows intensity fringes from two interfering spherical waves with and without compensating aberrations and their difference, and the corresponding spatial frequency components.

As mentioned above, interfering spherical waves produce hyperbolic fringes, not straight fringes as are implicit in Eqs. 10-12. The nature of the problem is demonstrated by performing a numerical simulation which is shown in FIG. 6. The off-axis lobes of the Fourier transform of the hyperbolic fringe pattern are not delta functions. Instead, they are compact functions with some shape. Referring to Eq. 7, the PCMP is convolved with this compact function. It is desirable to straighten the fringes to make the off-axis lobes more point-like. Doing so increases the fringe visibility/SNR and simplifies the process of recovering the PCMP.

As is seen in FIG. 6, adding an $(x^4+y^4)$ term (spherical aberration) to the interfering spherical waves significantly straightened the fringes so the off-axis lobes of the Fourier transform are closer to an ideal delta function. In generating the fringes in FIG. 6, each aberrated spherical wave was formulated as follows, $$U(r_0)=U_0/r_0 \exp(ik\sqrt{r_0^2+(fac)(x_0^4+y_0^4)}) \quad (14)$$

For the optical system of FIG. 2, this correction can be implemented as follows. The FZP 208 producing the dual beams $U_0$ and $U_1$ can be generated using an aberrated spherical wave. The spherical wave of Eq. 4 is replaced by an aberrated wave formulated as in Eq. 14. The corresponding fringe pattern is then calculated in the detector plane and the value of the aberrations optimized to produce point-like off-axis lobes in the Fourier transform of the fringe pattern.

It is straightforward to generalize Eq. 14 to use additional aberrations. Because the fringes are not radially symmetric, using asymmetric aberrations like astigmatism and coma should result in straighter fringes. This would yield more compact off-axis lobes than the example shown in FIG. 6, and hence a more accurate estimation of the PCMP and CMR.

Computational and Data System 700

As noted above, the nominal system produces data at a peak rate of 0.84 Gpix/s. Assuming 16 bit pixels, this is 13.4 Gbit/s. This is well within the data transfer and data storage rates of modern computer buses and storage systems, if the system is designed to store all data in real-time.

It may be preferable to compute the CMR in real-time. This can be accomplished using graphics processing units (GPUs) as special purpose processors. There are many GPUs available which can perform TFlops/s, for example the NVIDIA TITAN RTX which delivers 130 TFlops (see https://www.sensorsmag.com/embedded/gpu-delivers-130-teraflops-deep-learning). GPUs have been used to perform the FFTs used in these algorithms (see H. Bauke, C. Keitel, "Accelerating the Fourier split operator method via graphics processing units," Computer Physics Communications Volume 182, Issue 12, Pages 2454-2463, 2011) and can be programmed to implement the FM algorithm and back-propagation. The engineering of a real-time system is complex, especially when one considers that some parameters of the processing will be adapted to the data. However, data and computation systems with the necessary bandwidth and computing power are known to those skilled in the art.

Simulation

A numerical simulation of the APMI imaging system of the present invention was performed to evaluate the performance of the system and in order to engineer the data system and algorithms. The simulation assumes that a coherent beam from EUV source 100 passes through a compound FZP 208 which generates two perfect spherical waves, $U_0$ and $U_1$. One beam ($U_0$) is reflected by the mask CMR $P_M$ and propagated to the detector plane. The other beam ($U_1$) is returned to the detector plane via mirrors $R_2$ and $R_3$. The two beams $U_0$ and $U_1$ received at the detector are added and the intensity image is calculated. The FM algorithm described above is applied to the intensity to estimate the PCMP. The resulting PCMP is numerically propagated back to the mask plane to estimate the CMR. The following steps were performed:
1. Generate a sample image of the USAF resolution target.
2. Calculate the amplitude and phase of two spherical waves $U_0$ and $U_1$ at the detector, whose center points are offset by a small distance resulting in a small effective angle of incidence at the imaging sensor.
3. Propagate the sample image $P_M$ from the mask plane to the detector.
4. Calculate the intensity at the detector, $|\mathcal{P}U_0+U_1|^2$, and smooth the edges by multiplying with a super Gaussian factor.
5. Calculate the FFT, mask off the appropriate off-axis pattern, i.e. set all portions of the FFT to zero except the appropriate off-axis pattern, then calculate the inverse FFT to estimate the PCMP.
6. Numerically back propagate the PCMP estimate to estimate the CMR. Here is a description of the steps in more detail.

Step 1. An ideal binary image of the USAF resolution target was spatially filtered in order to simulate finite resolution of the fabrication process. FIG. 7 shows the smoothed target, a 2048×2048 array with 54 nm pixels.

Step 2. In order to separate the signals in frequency space, the two spherical wave origins were offset in x with a separation that produces a fringe pattern with a 3 pixel period at the detector. The detector pixels were assumed 6 µm. With NA=0.1 illumination, a propagation distance of 41 mm appropriately spread the propagated image across the detector and set the separation of the sources to 31 µm. $U_0$ and $U_1$ were calculated as spherical waves, i.e., there was no paraxial approximation. Considering the interference of the spherical waves, FIG. 8 shows the Fourier transform of the intensity pattern. FIGS. 8a and 8b show $\log_{10}$ of the transform for pure spherical waves. FIG. 8c shows $\log_{10}$ of the transform for waves with a $(x^4+y^4)$ term that straightens the fringes.

Note that for simplicity, the two beams are displaced along the X axis or angled about the Y axis. It is preferable to offset the beams at 45° to the imaging sensor axes since that maximizes the available area in frequency space for the off-axis lobes, thereby increasing the resolution. For a system such as that shown in FIG. 2, this can easily be accomplished by rotating the detector by 45° relative to the fringes or displacement vector.

Steps 3-4. Using available code, the USAF pattern was propagated using a split-step Fresnel propagation. The Talanov lens transformation was used to take the spherical wavefront illumination into account (see V. I. Talanov:

"Focusing of light in cubic media," JETP Letters 11, 799, 1970 [ZhETP Pis. Red. 11, 303 20 (March 1969)]; Fleck, J. A., Morris, J. R. & Feit, M. D., "Time-dependent propagation of high energy laser beams through the atmosphere," Appl. Phys. Volume 10, pp 129-160, 1976). The pixel grid at the sample image and propagation distance are chosen to match the implicit magnification by this method. The PCMP and the fringe pattern resulting from $|\mathcal{P} U_0+U_1|^2$ is shown in FIG. 9. FIG. 9b represents the output of the imaging detector.

Steps 5-6. The FFT of the interference pattern, e.g., FIG. 9b, is calculated. The sidelobe used to recover the PCMP is masked off. FIG. 10 shows the outputs at various steps in the algorithm. In the example shown, a circular mask with the diameter ⅓ the width of frequency space was used. The masked off FFT is inverse transformed to estimate the PCMP. This complex function is then back-propagated to estimate the CMR. As expected, adding aberrations to straighten the fringes improves the resolution of the output, especially in the direction perpendicular to the fringes, as is seen in the improvement from FIG. 10e to FIG. 10f. FIG. 10f is not quite as sharp as FIG. 7b. This is due to the spatial frequency filtering of FIG. 10b. Applying equivalent filtering to FIG. 7b produces an image the same as FIG. 10f.

The phase of the recovered image is shown in FIG. 11. The input image had the phase equal to zero. The recovered image has nearly flat phase over each bar, but there is some shape to the phase, presumably due to the deviation of the fringes from perfectly straight ones as seen in FIG. 6. The recovered image had to be corrected for linear phase ramps due to the angle between the beams and resulting position of the off-axis lobes.

This simulation is representative of the sort of imaging capable with the apparatus and method described herein. However, some discrepancies from the actual imaging scenario shown in FIG. 2 exist, which could point to differences between the simulation and results of a real system. They are listed in decreasing order of importance:

1. The simulation uses the Fresnel approximation for propagation from the mask to the detector. Within the limits of scalar diffraction, the spherical component of the wavefront is accurately modeled but the propagation relies on an approximation. Depending on the NA of the beams, a more accurate propagator may be required to recover the CMR with highest accuracy.
2. The simulation assumes the illumination and reference beams are ideal spherical waves emitted from a point source. The system outlined in FIG. 2 differs in 2 ways. First, the beam is generated by a finite diameter FZP focusing a plane wave to a diffraction limited spot. This will limit the resolution of the system based on the NA of the beam as the resulting illumination is equivalent to a superposition of point sources over a diffraction limited spot whose size is set by the wavelength and NA. Second, the converging $U_0$ beam reflects off the mask before passing through focus. This likely introduces non-uniform illumination of the mask, which can likely be calibrated.
3. The simulation assumes the reference beam point source is symmetrically offset from the illumination beam point source about the axis defined by the center of the object (i.e., the mask) and the imaging sensor. Their path lengths to the imaging sensor are nominally exactly equal. A deterministic small offset can be added to simulate non-ideal assembly.
4. Propagation of the beams is always in the same (forward) direction and the mask and imaging sensor are in parallel planes. The mask is assumed to be an infinitely thin pattern that multiplies the complex amplitude of the incident beam to modulate its magnitude and phase. Thus the inclination of the illumination beam incident on the mask plane is not simulated, so issues of keystoning or propagation back to an inclined plane are not considered. It also assumes the beams are perfectly coherent.

A more complete simulation can be constructed which includes all the non-ideal features of a real device, but this simulation models the features of the proposed invention which directly bear on its utility. Aside from being a limited proof-of-concept, the imaging simulation is useful in engineering an APMI system. By varying certain parameters, the potential resolution and accuracy of a system can be probed, allowing some engineering to be done by running simulations. In addition, the effect of non-idealities can be simulated in order to validate the sensitivity of the approach. For example, a random phase due to non-flatness of the mask blank, path length mismatch between the illumination and reference beams, focus drift of the system, detector noise and detector non-uniformity can all easily be simulated to probe their effect on the recovered CMR.

Exercising the simulation has quantified some of the sensitivity of the system. For example, it was found that a path length mismatch of 1 micron between the reference beam $U_1$ and the illumination beam $U_0$ significantly limited resolution for the 0.1 NA case described above. In addition, the path length to the mask for the back propagation must be known to better than 100 nm in order to produce clean images at the highest resolution. Since that value is not likely to be known to that accuracy from the mechanical construction, it must be found after assembly by optimizing the image of a known object.

Some Unique Features of the Present Invention

The approach of the present invention differs from other approaches in several ways. In contrast with conventional aerial imaging, the approach of the present invention does not require that the mask be maintained at an absolute Z (focus) position with nm precision. If the Z position of the mask varies as the surface is scanned, it is possible to compensate for this by varying the Z distance used when back propagating the PCMP. The Z distance can be optimized by various measures, e.g., the sharpness of the recovered image or its match to the known mask pattern, and the optimized value used for the recovery. The Z position will vary smoothly as the mask is scanned. This smooth variation can be fit in software, and will likely repeat from scan to scan, so the software burden for tracking it will be minimal.

As this is a coherent imaging method, it provides the modulus and phase of the mask reflectivity. In contrast to CDI, this method requires no iteration—the FM algorithm and subsequent back propagation are direct methods. This enables reliable engineering of a real-time imaging system or a post-processing system, since the computational burden to produce an image is fixed.

Another distinctive feature of the present invention is that this imaging approach does not require curved reflective EUV optics. It requires several flat mirrors, but these are much easier and less costly to fabricate than the reflective imaging optics required for aerial imaging. However, the required coherent source of the present invention is a unique component.

Modifications

The described embodiments of the invention are intended to be merely exemplary and numerous variations and modifications will be apparent to those skilled in the art. All such variations and modifications are intended to be within the scope of the present invention.

Among other things, it will be appreciated by those skilled in the art that the invention described herein is not limited in application to semiconductor masks or mask blanks but may be applied to imaging a variety of objects in reflection or transmission. It will also be appreciated by those skilled in the art that the invention is not limited to quasi-planar objects, but may be applied to objects where the source light interacts over some significant depth of the object. The back propagation can be done to varying distances, thereby enabling reconstruction of the object as a function of depth. These and other variations are considered to be within the scope of the present invention.

What is claimed is:

1. An apparatus for imaging an object with resolution less than 100 nm, the apparatus comprising:
   a coherent light source with wavelength less than 120 nm;
   an optical system for directing the source light to an object and directing light from the object to an imaging sensor, wherein the optical system divides the source light into a first beam and a second, different beam and directs the first beam to illuminate the object and directs the second beam to interfere with the first beam, and wherein the angle between the two beams is less than 6.75 mrad; and
   a computational system that processes the imaging sensor data to generate phase and amplitude images of the object.

2. The apparatus according to claim 1 wherein the coherent light source uses high harmonic generation (HHG) for producing the source light.

3. The apparatus according to claim 1 wherein the coherent light source uses a free electron laser (FEL) for producing the source light.

4. The apparatus according to claim 1 wherein the optical system comprises a diffractive optic.

5. The apparatus according to claim 1 wherein the optical system comprises a compound zone plate optic comprising a transmissive diffractive optic.

6. The apparatus according to claim 1 wherein the optical system comprises a series of mirrors to direct the second beam.

7. The apparatus according to claim 1 wherein the object is a mask designed for semiconductor lithography, and further wherein the coherent light source has the same wavelength as is used with the mask for semiconductor lithography.

8. The apparatus according to claim 1 wherein the imaging sensor comprises an imaging array with pixels 6 microns square or smaller.

9. An apparatus for imaging an object, the apparatus comprising:
   a coherent light source;
   an optical system for directing the source light to an object and directing light from the object to an imaging sensor, wherein the optical system divides the source light into a first beam and a second, different beam and directs the first beam to illuminate the object and directs the second beam to interfere with the first beam, and wherein the two beams have optical aberrations which produce straighter interference fringes than purely spherical waves; and
   a computational system that processes the imaging sensor data to generate phase and amplitude images of the object.

10. A method for imaging an object with resolution less than 100 nm, the method comprising:
    providing coherent light with wavelength less than 120 nm;
    directing the light to an object and directing light from the object to an imaging sensor, wherein an optical system divides the source light into a first beam and a second, different beam and directs the first beam to illuminate the object and directs the second beam to interfere with the first beam, and wherein the angle between the two beams is less than 6.75 mrad; and
    processing the imaging sensor data to generate phase and amplitude images of the object.

11. The method according to claim 10 wherein the coherent light is produced using high harmonic generation (HHG).

12. The method according to claim 10 wherein the coherent light is produced using a free electron laser (FEL).

13. The method according to claim 10 wherein the optical system comprises a diffractive optic.

14. The method according to claim 10 wherein the optical system comprises a compound zone plate optic comprising a transmissive diffractive optic.

15. The method according to claim 10 wherein a series of mirrors are used to direct the second beam.

16. The method according to claim 10 wherein the object is a mask designed for semiconductor lithography, and further wherein the coherent light source has the same wavelength as is used with the mask for semiconductor lithography.

17. The method according to claim 10 wherein the imaging sensor comprises an imaging array with pixels 6 microns square or smaller.

18. The method according to claim 10 wherein the processing comprises a Fourier masking algorithm to recover the propagated complex mask pattern.

19. The method according to claim 10 wherein the processing comprises an algorithm wherein a diffraction propagation algorithm is applied to the propagated complex mask pattern to generate phase and amplitude images of the object.

20. A method for imaging an object, the method comprising:
    providing coherent light;
    directing the light to an object and directing light from the object to an imaging sensor, wherein an optical system divides the source light into a first beam and a second, different beam and directs the first beam to illuminate the object and directs the second beam to interfere with the first beam, and wherein the two beams have optical aberrations which produce straighter interference fringes than purely spherical waves; and
    processing the imaging sensor data to generate phase and amplitude images of the object.

21. The apparatus according to claim 9 wherein the optical system comprises a diffractive optic.

22. The apparatus according to claim 9 wherein the optical system comprises a compound zone plate optic comprising a transmissive diffractive optic.

23. The apparatus according to claim 9 wherein the optical system comprises a series of mirrors to direct the second beam.

24. The apparatus according to claim 9 wherein the object is a mask designed for semiconductor lithography, and further wherein the coherent light source has the same wavelength as is used with the mask for semiconductor lithography.

25. The method according to claim 20 wherein the optical system comprises a diffractive optic.

26. The method according to claim 20 wherein the optical system comprises a compound zone plate optic comprising a transmissive diffractive optic.

27. The method according to claim 20 wherein a series of mirrors are used to direct the second beam.

28. The method according to claim 20 wherein the object is a mask designed for semiconductor lithography, and further wherein the coherent light source has the same wavelength as is used with the mask for semiconductor lithography.

29. The method according to claim 20 wherein the processing comprises a Fourier masking algorithm to recover the propagated complex mask pattern.

30. The method according to claim 20 wherein the processing comprises an algorithm wherein a diffraction propagation algorithm is applied to the propagated complex mask pattern to generate phase and amplitude images of the object.

* * * * *